United States Patent
Oteki et al.

(10) Patent No.: US 7,336,386 B2
(45) Date of Patent: Feb. 26, 2008

(54) IMAGE PROCESSOR INCLUDING A DATA COMPRESSION UNIT HAVING A SWITCH AND IMAGE PROCESSING METHOD THEREOF

(75) Inventors: Sugitaka Oteki, Tokyo (JP); Yoshiyuki Namizuka, Kanagawa (JP); Yuji Takahashi, Kanagawa (JP); Hideto Miyazaki, Kanagawa (JP); Yasuyuki Nomizu, Kanagawa (JP); Hiroyuki Kawamoto, Kanagawa (JP); Rie Ishii, Tokyo (JP); Takeharu Tone, Tokyo (JP); Shinya Miyazaki, Tokyo (JP); Fumio Yoshizawa, Kanagawa (JP); Hiroaki Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 710 days.

(21) Appl. No.: 09/772,945

(22) Filed: Jan. 31, 2001

(65) Prior Publication Data

US 2002/0012131 A1 Jan. 31, 2002

(30) Foreign Application Priority Data

Jan. 31, 2000 (JP) .............................. 2000-023131

(51) Int. Cl.
*G06F 15/00* (2006.01)
*H04N 1/32* (2006.01)
*G06K 9/36* (2006.01)

(52) U.S. Cl. .............................. 358/1.16; 358/426.01; 382/234

(58) Field of Classification Search ............... 358/1.15, 358/1.16, 1.17, 426.13, 426.14, 1.14, 444, 358/468, 426.01; 382/232, 234, 235, 243, 382/244, 166

See application file for complete search history.

(56) References Cited

U.S. PATENT DOCUMENTS

| | | | | |
|---|---|---|---|---|
| 4,580,163 A * | 4/1986 | Hartmeier | ..................... | 348/448 |
| 4,800,440 A * | 1/1989 | Kurokawa | ..................... | 382/246 |
| 5,050,221 A | 9/1991 | Ohta et al. | ..................... | 382/177 |
| 5,305,310 A * | 4/1994 | Itoh et al. | ..................... | 370/392 |
| 5,345,272 A * | 9/1994 | Ersoz et al. | ..................... | 348/561 |
| 5,754,705 A * | 5/1998 | Okino | ..................... | 382/250 |
| 5,764,373 A * | 6/1998 | Matoba et al. | ..................... | 382/232 |
| 5,787,192 A * | 7/1998 | Takaichi et al. | ..................... | 382/166 |
| 5,912,742 A * | 6/1999 | Matoba et al. | ..................... | 382/233 |
| 6,041,139 A * | 3/2000 | Okubo et al. | ..................... | 382/199 |
| 6,151,457 A | 11/2000 | Kawamoto | ..................... | 358/1.14 |
| 6,263,111 B1 * | 7/2001 | Matoba et al. | ..................... | 382/232 |
| 6,366,702 B1 * | 4/2002 | Obara et al. | ..................... | 382/237 |
| 6,550,026 B1 * | 4/2003 | Wright et al. | ..................... | 714/719 |
| 6,781,715 B1 * | 8/2004 | Nakajima et al. | ..................... | 358/1.9 |
| 6,795,581 B1 * | 9/2004 | Nomura | ..................... | 382/232 |

FOREIGN PATENT DOCUMENTS

| | | |
|---|---|---|
| JP | 5-276374 | 10/1993 |
| JP | 8-274986 | 10/1996 |
| JP | 10-336462 | 12/1998 |
| JP | 11-17955 | 1/1999 |
| JP | 2001-186355 | 7/2001 |

* cited by examiner

*Primary Examiner*—Madeleine A V Nguyen
(74) *Attorney, Agent, or Firm*—Oblon, Spivak, McClelland, Maier & Neustadt, P.C.

(57) ABSTRACT

The image processor comprises a switch that divides image data into m×n pixels, having n lines with m pixels per one line; a group of line memories that store the divided image; a compression device which batch compresses the image data of m×n pixels. Further, a command control unit provides control so as to send the (n−1) lines of image data among m×n pixels of image data to the group of line memories, and the remaining one line of image data directly to the compression device 902, and to send the m×(n−1) pixels of image data stored in the line memories to the compression device.

5 Claims, 22 Drawing Sheets

IMAGE PROCESSOR INCLUDING A DATA COMPRESSION UNIT HAVING A SWITCH AND IMAGE PROCESSING METHOD THEREOF

FIELD OF THE INVENTION

The present invention relates to an image processor and image processing method, and especially, to an image processor performs compression or expansion of image data using a line memory.

BACKGROUND OF THE INVENTION

Conventionally, analog copying machines, and digital copying machines which process digitalized image data are known. Moreover, now a days integrated digital machines that integrates, facsimile, printer, and scanner with the copying machine, have appeared in market.

FIG. 15 shows a block diagram of one embodiment of a hardware configuration for a digital integrated machine according to a conventional technique. As shown in FIG. 15, the digital integrated machine 1500 has realized all the functions as a digital integrated machine by the following configuration, wherein: component parts as a copy machine (copy machine parts) comprises a series of component parts such as a read unit 1501; an image processing unit 1502; a video control unit 1503; a write unit 1504, and further a memory control unit 1505; and a memory module 1506, and the component parts are additionally connected, through a motherboard 1511, to, for example, a facsimile control unit 1512; a printer control unit 1513, and a scanner control unit 1514.

That is, functions of a digital integrated machine have been realized by one system comprising a series of the component parts. Specifically, the facsimile control unit 1512, the printer control unit 1513, and the scanner control unit 1514 are added to the copy machine units for which a series of operations are controlled by a system controller 1507, RAM 1508, and ROM.

Moreover, there have been proposed another digital integrated machine (not shown) which efficiently processes image data input from each unit shown above by a configuration where the copying function unit, the facsimile function unit, the printer function unit, and so on are made as one unit, respectively, and the units made above are integrated, not depending on the addition of the units onto the copying machine.

Transfer control of image data has become a very important element along with increase in the functions of the digital integrated machine in order to improve the system performance, whether the digital integrated machine has a configuration in which the function units are added through the motherboard, or the one in which each independent function unit are combined without dedication to the copying machine.

Therefore, image data have been conventionally compressed as required from a viewpoint of transfer control, that is, considering the efficiency of image data transfer between function units, and that of storage of memories and so on in the storage unit. In other words, the digital integrated machine has improved its performance by compression of the image data.

A conventional data compression unit to compress image data will be described below. FIG. 16 shows a block diagram of one embodiment for a configuration of a conventional data compression unit, and FIG. 17 an explanatory view of a processing timing for the configuration.

In FIG. 16, a data compression unit 1601 comprises a storage unit 1602 to store image data; a compression device 1603 to compress image data; and a control unit 1604 to control the storage unit 1602 and the compression device 1603. The above storage unit 1602 comprises a line memory group 1605 having a plurality of 1-port FIFO memories FM1a, FM1b, FM2, FM3, and FM4; an output switch 1606 to switch the output end of image data; and an input switch 1607 to switch the input end of image data between the FIFO memories FM1a and FM1b.

Moreover, in order to simplify the description, a compression area for compression with the compression device 1603 is assumed to be a rectangular area of four lines×four pixels per one line having four pixels in the main scanning (pixel) direction, and four lines in the sub scanning (line) direction, as shown in FIG. 18.

As shown in FIG. 17, in order to compress image data, the image data of the first line of a rectangular area is written (perform "write") into the FIFO memory FM1a, in the first place. Thereafter, the image data of the second line, that of the third line, and that of the fourth line are sequentially written into the FIFO memories FM2; FM3; and FM4, respectively. The above division of the image data is performed by the output switch 1606 under control of the control unit 1604.

Four lines of data to be compressed at the compression device 1603 get ready at a stage where image data have been written in the FIFO memory FM4. Thereafter, the image data of the fourth line are read from those of the first line stored in the FIFO memory FM1a, FM2, FM3, and FM4 (read) to send them to the compression device 1603. The above sending control is performed by the control unit 1604. The above compression device 1603 compresses the four lines of the image data, which have been input, to output the compressed image data. The above compressed image data are stored in the memory module 1506, after passing through the memory control unit 1505.

On the other hand, after the image data of the fourth line are written in the FIFO memory FM4, the image data of the first line (the image data of the fifth line) in the next rectangular area are input. The control unit 1604 performs write control of the image data of the fifth line in the FIFO memory FM1b for conflict avoidance in the memory use.

After the, the image data of the sixth line, those of the seventh line, and those of the eighth line are sequentially written in the FIFO memory FM2, FM3 and FM4, respectively.

The control unit 1604 reads the image data of the eighth line from those of the fifth line stored in the FIFO memories FM1b, FM2, FM3, and FM4 to send them to the compression device 1603, while performing the write control of the image data of the ninth line in the next rectangular area in the FIFO memory 1a. A series of image data sequentially input may be compressed without any problems by repetition of the processing.

Moreover, 2-port FIFO memories may be used, though each FIFO memory is a 1-port FIFO memory in the embodiment. FIG. 19 shows a view of one embodiment of a configuration of a data compression unit using the 2-port FIFO memory for apart, and FIG. 20 shows an explanatory view of the processing timing. As a data compression unit 1901 has the similar configuration to that of the data compression unit 1601, except replacement of the FIFO memories FM1a, and FM1b of the data compression unit 1601, and the switch 1607 by a 2-port FIFO memory FMD1, the description will be eliminated.

It is shown in FIG. 20, as an operation of the data compression unit 1901, that image data of the first line to the fourth line, which are stored in the FIFO memories FMD1, FM2, FM3, and FM4, are read, and sent to a compression device 1903 after writing the image data of the fourth line in the FIFO memory FM4. Along with the read control, the image data of the next fifth line are written in the FIFO memory FMD1.

Similarly, while the image data of the ninth line are written in the FIFO memory FMD1, the image data of the fifth line to the eighth line, which are stored in the FIFO memories FMD1, FM2, FM3, and FM4, are read, and sent to the compression device 1903 after storing the image data of the eighth line in the FIFO memory FM4.

Thereby, one 1-port FIFO memory may be eliminated, and a series of image data sequentially input may be compressed without any problems by using one 2-port FIFO memory for a part of the FIFO memories.

On the other hand, the compressed image data are expanded, as required, for the subsequent operations. Especially, in the digital integrated machine, there have been many cases where the compressed image data stored in the memory module 1506 are required to be expanded, based on the varieties of the functions.

A conventional data expansion unit to expand image data will be described. FIG. 21 shows a block diagram of one embodiment of a conventional configuration of a data expansion unit, and FIG. 22 an explanatory view of the processing timing.

In FIG. 21, a data expansion unit 2101 comprises: an input side storage unit 2102 to input compressed image data; an expansion device 2103 to expand image data; an output side storage unit 2104 to store the expanded data; and a control unit 2105 to control the input side storage unit 2102, the expansion device 2103, and the output side storage unit 2104. Here, it is assumed in order to simplify the description that image data compressed every image data of a rectangle area with four lines×four pixels per one line are expanded.

The input side storage unit 2102 comprises: two 1-port FIFO memories FMI1 and FMI2 to store compressed image data in the rectangular area; and an output switch 2106 to send the compressed image data in the rectangular area to the FIFO memory either FMI1 or FMI2 by switching.

The output side storage unit 2104 comprises; a memory group 2107 having three 1-port FIFO memories FM1, FM2, and FM3 and one 2-port FIFO memory FMD4; and an input switch 2108 to switch the input end of the image data output from the memory group 2107.

In the first place, compressed image data in a rectangular area are sent to the FIFO memory FMI1, for expansion of image data, as shown in FIG. 22. The above compressed image data are sent to the expansion device 2103 for batch expansion of them to four lines of image data of the first line to the fourth line. The expanded image data of the first line, that of the second line, that of the third line, and that of the fourth line are written into the FIFO memories FM1; FM2; FM3; and FMD4, respectively.

Thereafter, image data of the first line to the fourth line which are stored in the FIFO memories FM1, FM2, FM3, and FMD4, are sequentially read and sent to a predetermined output destinations, according to a line data output synchronous signal (not shown). On the other hand, compressed image data of the fifth line to the eighth line stored in the FIFO memory FMI2 are expanded in the expansion device 2103, and stored in the FIFO memories FM1 to FMD4.

During the time, reading of the fourth line and writing of the eighth line are controlled so as to be simultaneously performed in the FIFO memory FMD4. Therefore, the FIFO memory FMD4 is configured to be a 2-port FIFO memory to simultaneously perform read and write.

Thereby, one 1-port FIFO memory may be eliminated in a similar way to that of the data compression unit 1901 and the image data may be continuously sent without any problems after expansion of a series of image data sequentially input, when one 2-port FIFO memory is used for a part of the FIFO memories.

As described above, in a conventional image processor (digital integrated machine), improved efficiency in the transfer control has been required in order to improve the system performance, and, then, the data compression unit and the data expansion unit, before and after which proper line memories are installed, have been provided for achievement of the requirement.

Moreover, for example, a "Image processor" (for example, Japanese published unexamined application HEI8 (1996)-274986), which performs simultaneous operation of a plurality of functions such as image processing of read signal, and image storage into memories, and realizes the best efficiency in each function, has been disclosed, and in some case, various kinds of functions for image processing have been realized by one configuration for image processing.

However, there have been the following problems. As mentioned above, the data compression unit or the data expansion unit has a configuration which comprises a plurality of line memories before and after the compression device or the expansion device. As for the line memories, one line memory is required to previously be designed so as to have larger capacity, and the number of the line memory is also required to be designed to be larger, as there are different kinds of capacities for input image data according to kinds and performances of added function units or combined function units.

Especially, a part of function units for the digital integrated machine, which combines each function unit, are required to be exchanged for meeting improved functions in some case. Therefore, one line memory is required to be designed so as to have larger capacity, and the number of the line memory is also required to be designed to be larger, according to the circumstances.

For example, when a manuscript is read at 600 dpi (dots per inch) per one line with 8 bits per one pixel, line memories with 8 bits×8 k words are required for storage of one line of image data as about 8K (1K=1024) are required for the longitudinal direction of the A4 size.

That is, in an image processor (digital integrated machine) according to conventional technologies, there has been a problem that the circuit size becomes larger, as the number of the line memory is also required to be larger, and the one line memory is required to have larger capacity. There were problems that the circuit size of the 2-port FIFO memory is still larger, compared with that of a 1-port FIFO memory, even when one 1-port line memory may be eliminated (See FIG. 19 and FIG. 21) by using a 2-port FIFO memory as a line memory.

In addition, in the case of the digital integrated machine which combines each function unit, the circuit size is required to be as small as possible at the design stage, and, then, the size of the function unit including the data compression unit or the data expansion unit is required to be as small as possible, too, as the machine is used under combination with other function units.

SUMMARY OF THE INVENTION

It is an object of the present invention to provide an image processor and image processing method with reduced circuit size in order to solve the problems according to conventional technology.

The image processor according to one aspect of this invention comprises a dividing unit which divides image data into m×n pixels, having n lines with m pixels per one line; a storage unit which stores the image data of pixels, which are divided by the dividing unit; a control unit that provides a control so as to send the image data of pixels divided by the dividing unit, and the image data stored by the storage unit, respectively, to a predetermined destination; a compression unit which batch compresses the image data of m×n pixels. The control unit sends (n−1) lines of image data among the image data of m×n pixels divided by the dividing unit to the storage unit, and the remaining one line of image data directly to the compression unit; and controls sending of the image data of m×(n−1) pixels stored in the storage unit to the compression unit. Accordingly, the capacity of one line of image data stored in storage unit is reduced.

Furthermore, in the above-mentioned image processor, it is preferable that, the storage unit comprises (n−1) number of FIFO memories, and the control unit controls sending of each line of the image data divided by the dividing unit to the FIFO memories, respectively. Accordingly, a simple control method may be realized by using a plurality of FIFO memories to facilitate the circuit design.

The image processor according to another aspect of this invention comprises an expansion unit which batch expands compressed data, that is, of compressed image data of m×n pixels; a storage unit which stores expanded image data by the expansion unit, a control unit which provides a control so as to send the expanded image data by the expansion unit to a predetermined destination, and the image data stored by the storage unit to a predetermined output destination. The control unit sends one line of image data, which are expanded by the expansion unit, and comprise m pixels per one line, directly to the predetermined output destination, and image data with the remaining (n−1) lines of pixels to the storage unit; and then controls sending of the image data with (n−1) lines of pixels stored in the storage unit to the predetermined output destination. Accordingly, the capacity of one line of image data stored in the storage unit is reduced.

Furthermore, in the above-mentioned image processor, it is preferable that, the storage unit comprises (n−1) number of FIFO memories, and the control unit controls sending of each line of the image data expanded by the expansion unit, respectively. Accordingly, a simple control method may be realized by using a plurality of FIFO memories to facilitate the circuit design.

The image processor according to another aspect of this invention comprises an input unit which inputs compressed data of image data compressed every image data of m×n pixels; an expansion unit which batch expands compressed data input by the input unit to the image data of m×n pixels; an extraction unit which extracts one line of image data, which comprise m pixels per one line, from image data of m×n pixels expanded by the expansion unit; an output unit which outputs one line of image data extracted by the extraction unit; a detection unit which detects whether one line of the image data has been output or not by the output unit; and a control unit that provides a control so as of the input and extraction unit. The control unit inputs the compressed data including the image data again by control of the input unit, when the output of the image data is detected by the detection unit; extracts one line of image data which have not been previously extracted by the extraction unit; and the one line to the n line of image data are sequentially output by repetition of the control. Accordingly, a means for storage of the image data expanded by expansion unit may be eliminated.

Other objects and features of this invention will become apparent from the following description with reference to the accompanying drawings.

DESCRIPTION OF THE PREFERRED EMBODIMENTS

Preferred embodiment of the image processor according to the present invention will be described in detail, referring to attached drawings.

Figure 1:
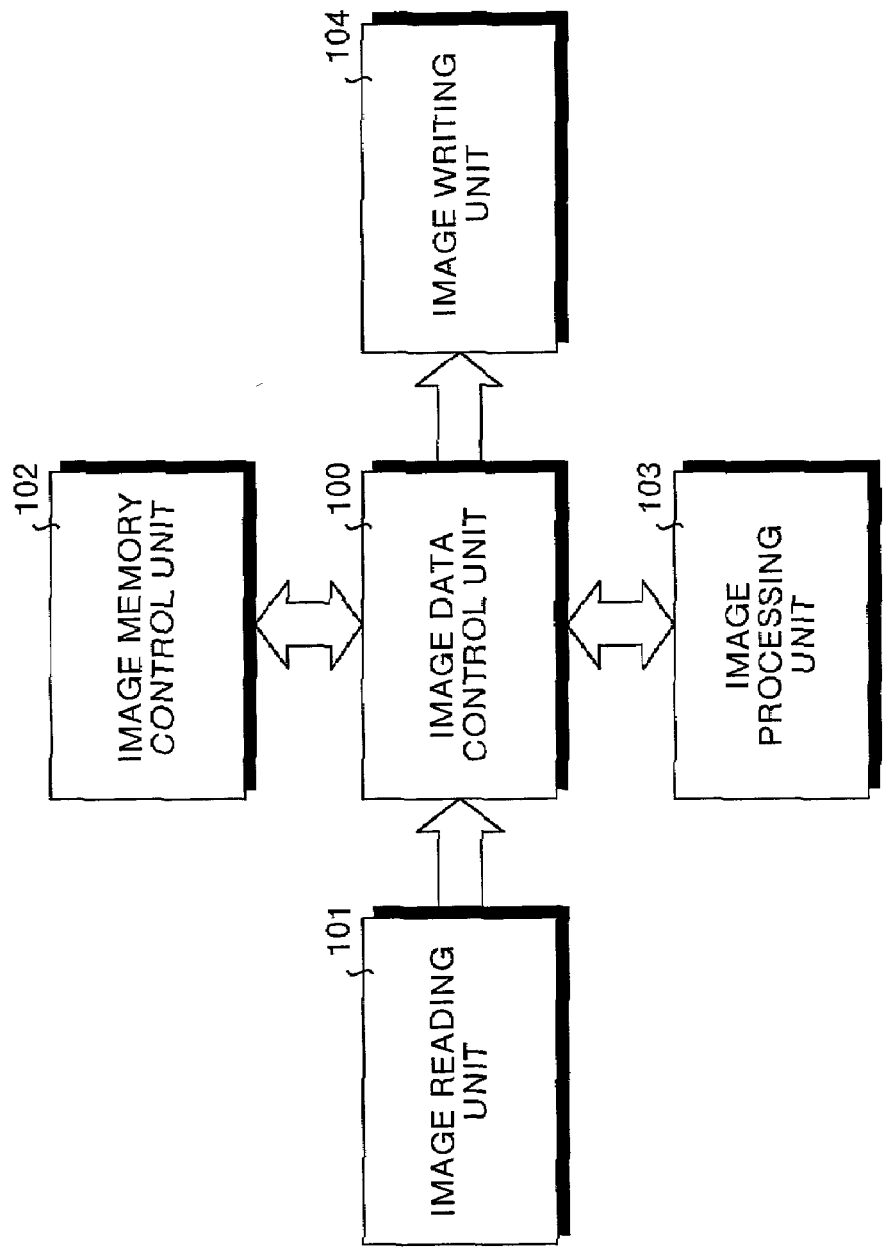
FIG. 1 shows a functional block diagram of a configuration of an image processor according to an first embodiment of the present invention.

In the first place, the principle of the image processor according to the present embodiment will be described. FIG. 1 shows a functional block diagram of a configuration of an image processor according to an embodiment of the present invention. In FIG. 1, an image processor has a configuration comprising the following five units.

The above five units are: an image data control unit 100; an image reading unit 101 to read image data; an image memory control unit 102 performing read/write of image data by control of an image memory storing images; an image processing unit 103 to perform image processing such as processing and editing of image data; and an image writing unit 104 to write image data onto transfer paper and so on.

The above each unit, that is, the image reading unit 101; an image memory control unit 102; an image processing unit 103; and an image writing unit 104 are connected each other through or round the image data control unit 100.

The image data control unit 100 performs the following kinds of processing, for example:

| | |
|---|---|
| (1) | Data compression processing (the first compression) for efficiency improvement in bus transfer of data; |
| (2) | Transfer processing of image data after the first compression; and |
| (3) | Image synthesis processing (synthesis of image data from a plurality of units may be synthesized. And synthesis on the data bus is included); |
| (4) | Image shifting processing (image shifting in the main and sub scanning directions); |
| (5) | Image area extension processing (an image area may be extended to the outer area by an arbitrary amount.); |
| (6) | Image size changing processing (for example, a fixed size changing of 50% or 200%); |
| (7) | Parallel bus interface processing; |
| (8) | Serial bus interface processing (interface with a process controller, which will be described later, 211); |
| (9) | Format conversion processing between parallel data and serial data; |
| (10) | Interface processing with the image reading unit 101; |
| (11) | Interface processing with the image processing unit 103; and |
| (12) | Expansion processing of data. |

The image reading unit 101 performs the following kinds of processing, for example:

| | |
|---|---|
| (1) | Reading processing of reflected light by a manuscript in an optical system; |
| (2) | Conversion processing to an electrical signal with CCD (Charge Coupled Device); |
| (3) | Digitalization processing with an analog to digital conversion device; |
| (4) | Shading correction processing (processing to correct uneven illuminance distribution of light source); and |
| (5) | Scanner γ correction processing (processing to correct the density characteristics of the reading system). |

The image memory control unit 102 performs the following kinds of processing, for example:

| | |
|---|---|
| (1) | Interface control processing with a system controller; |
| (2) | Parallel bus control processing (interface control processing with a parallel bus); |
| (3) | Network control processing; |
| (4) | Serial bus control processing (control processing of a plurality of external serial ports); |
| (5) | Internal bus interface control processing (command control processing with an operation unit); |
| (6) | Local bus control processing (access control processing of ROM, RAM, and font data in order to activate a system controller); |
| (7) | Operation control processing of memory modules (for example, writing/reading control processing of memory modules); |
| (8) | Access control processing to memory modules (processing by which memory access demand by a plurality of units is mediated); |
| (9) | Compression/expansion processing of data (processing to reduce data amount for effective use of memories); and |
| (10) | Image editing processing (data clear of memory areas, rotation processing of image data, and image synthesis processing on memories). |

The image processing unit 103 performs the following kinds of processing, for example:

| | |
|---|---|
| (1) | Shading correction processing (processing to correct uneven illuminance distribution of a light source); |
| (2) | Scanner γ correction processing (processing to correct the density characteristics of a reading system); |
| (3) | MTF (modulation transfer function) correction processing; |
| (4) | Smoothing processing; |
| (5) | Arbitrary size changing processing in the main scanning direction; |
| (6) | Density conversion (γ conversion processing: correspond to density notch); |
| (7) | Simple multivalued processing; |
| (8) | Simple valued processing; |
| (9) | Error diffusion processing; |
| (10) | Dither processing; |
| (11) | Dot arrangement phase control processing (toward-right dot, and toward-left dot); |
| (12) | Isolation point removal processing; |
| (13) | Image region separation processing (color judgment, attribute judgment, and adaptation processing); and |
| (14) | Density conversion processing. |

The image writing unit 104 performs the following kinds of processing, for example:

| | |
|---|---|
| (1) | Edge smoothing processing (jaggy correction processing); |
| (2) | Correction processing for dot re-arrangement; |
| (3) | Pulse control processing of an image signal; and |
| (4) | Format conversion processing between parallel data and serial data. |

Figure 2:
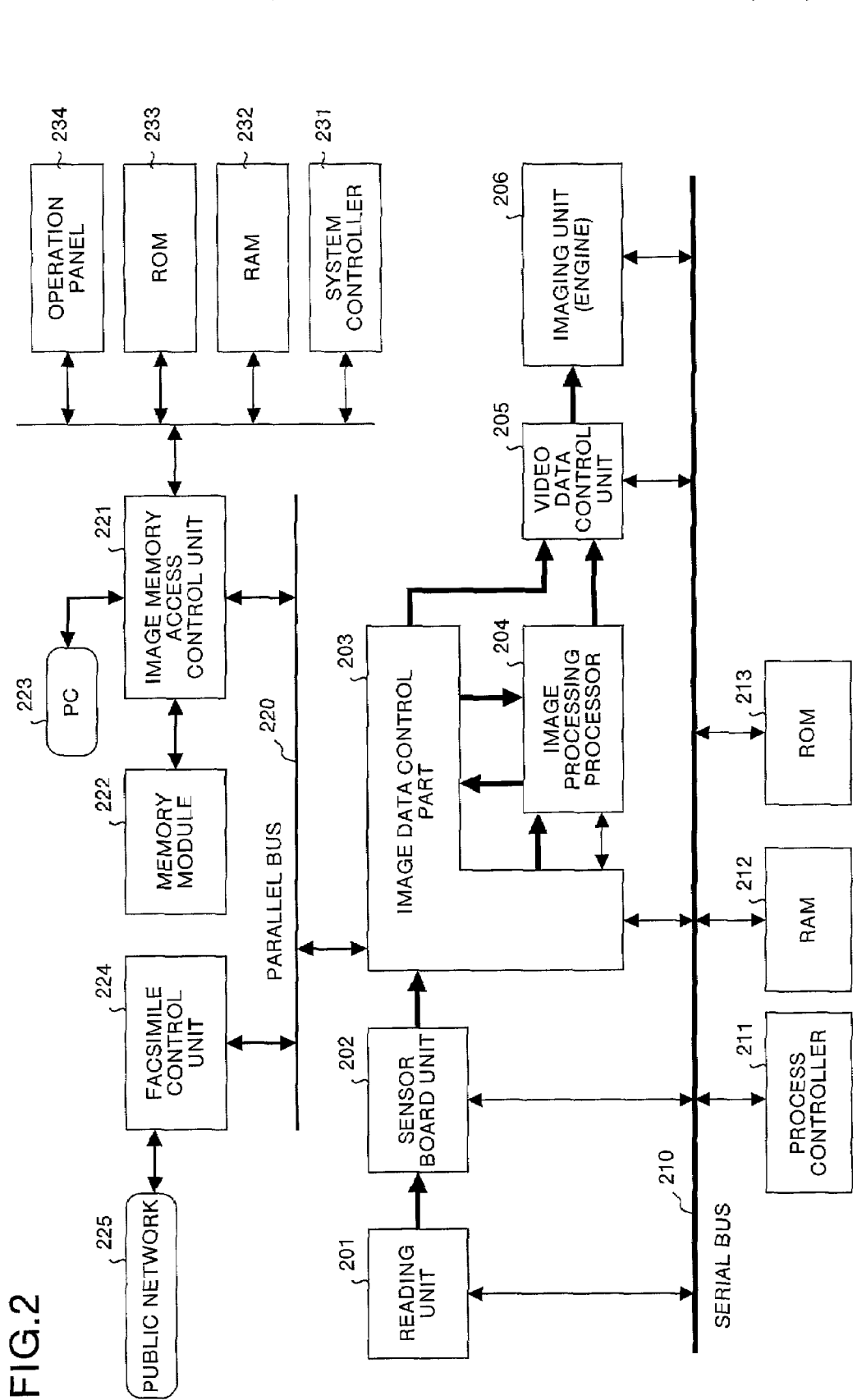
FIG. 2 shows a block diagram of one embodiment of a hardware configuration of an image processor according to the first embodiment.

A hardware configuration, in which a digital integrated machine comprises an image processor according to the present embodiment, will be described. FIG. 2 shows a block diagram of one embodiment of a hardware configuration of an image processor according to the present embodiment.

In the block diagram of FIG. 2, the image processor according to the present embodiment comprises: a reading unit 201; a sensor board unit 202; an image data control unit 203; an image processing processor 204; a video data control unit 205; and an imaging unit 206 (engine). Moreover, the image processor according to the present embodiment comprises: a process controller 211, a RAM 212 and a ROM 213, connected through a serial bus 210.

The image processor according to the present embodiment comprises: an image memory access control unit 221; and a facsimile control unit 224, connected through a parallel bus 220. Further, the image processor comprises: a memory module 222; and a system controller 231; a RAM 232; a ROM 233; and an operation panel 234, connected to an image memory access control unit 221.

Relations between each of the component and each unit 100 to 104 shown in FIG. 1 will be described. That is, the function of the image reading unit 101 shown in FIG. 1 is realized by the reading unit 201 and the sensor board unit 202. Similarly, the function of the image data control unit 100 is achieved by the image data control unit 203. In a similar way, the function of the image processing unit 1 is realized by the image processing processor 204.

The function of the image writing unit 104 is also achieved by the video data control unit 205 and the imaging unit 206 (engine). In addition, the image memory control unit 102 is realized by the image memory access control unit 221 and the memory module 222, similarly.

Configurations of each component will be described. The reading unit 201 reading a manuscript optically comprises a lamp, a mirror, and a lens. Reflected light of the lamp irradiation by the manuscript is collected onto a photo detector through the mirror and the lens.

The photo detector, for example, a CCD (Charge Coupled Device) is installed on the sensor board unit 202. The image data converted into an electrical signal at the CCD is converted into a digital signal for output (sending) from the sensor board unit 202.

The image data, which are output (sent) from the sensor board unit 202, is input to (received at) the image data control unit 203. The image data control unit 203 performs control of all the transmission of the Image data between functional devices (processing units) and the data bus.

The image data control unit 203 performs data transfer of the image data among the sensor board unit 202, the parallel bus 220, and the image processing processor 204; and communication between the process controller 211 and the system controller 231 for the whole control of the image processor. Moreover, the RAM 212 is used as a work area for the process controller 211, and the ROM 213 stores, for example, a boot program for the process controller 211.

The image data output (sent) from the sensor board unit 202 are transfer (sent) to the image processing processor 204 through the image data control unit 203, and are output (sent) to the image data control unit 203, again, after correction of signal degradation due to the optical system and quantization into digital signals (it is assumed to be the signal degradation of the scanner system).

The image memory access control unit 221 controls writing/reading of the image data into/from the memory module 222, and the operations of each component parts connected to the parallel bus 220. Moreover, the RAM 232 is used as a work area of the system controller 231 work area, and the ROM 233 stores, for example, the boot program of the system controller 231.

Processing to be performed by the image processor is input with the operation panel 234. For example, kinds of processing (copying, facsimile transmission, image reading, printing, and soon), and number of sheets for the processing are input. Thereby, input of control information for the image data may be input. However, the configuration of the facsimile control unit 224 will be described later.

Then, there are two kinds of jobs, that is, a job to re-use the read image data after accumulation in the memory module 222, and a job not to re-use of them without the accumulation. Hereinafter, the two jobs will be described. As an example of the accumulation of the data in the memory module 222, there is a method to read the accumulated image data a plurality of times, after the reading unit 201 is operated only once to read the image data, and the read data are accumulated in the memory module 222, when a plurality of copies are made for one sheet of a manuscript.

As an example of no accumulation of the data in the memory module 222, there is no deed to access to the access memory module 222 with the image memory access control unit 221, as only reproduction of the read image data as it is required when only one copy is made for one sheet of a manuscript.

In the first place, the data transferred from the image processing processor 204 to the image data control unit 203 is returned again to the image processing processor 204 from the image data control unit 203, when there is no use of the memory module 222. The image processing processor 204 performs picture quality control of conversion of the brightness data by CCD in the sensor board unit 202 into the area gradation one.

The image data after the picture quality processing is transferred to the video data control unit 205 from the image processing processor 204. After post processing of signals, which are changed into area gradation data, for dot arrangement, and pulse control for reproduction of the dots, a reproduced image is formed onto a piece of transfer paper in the imaging unit 206.

Hereinafter, there will be described flow of image data at additional processing, for example, rotation of the image direction, and synthesis, which is performed when reading the accumulated in the memory module 222. The image data transferred from the image processing processor 204 to the image data control unit 203 are sent to the image memory access control unit 221 from the image data control unit 203 to the parallel bus 220.

Here, access control of image data and memory module 222, expansion of data for printing at an external PC (personal computer) 223, and compression/expansion of image data for effective use of the memory module 222 are performed based on control of the system controller 231.

The image data sent to the image memory access control unit 221 are accumulated in the memory module 222 after data compression to read the accumulated image data as required. The read image data is expanded, restored to original image data, and returned to the image data control unit 203 from the image memory access control unit 221 to the parallel bus 220.

After transferring to the image processing processor 204 from the image data control unit 203, picture quality processing, and pulse control at the video data control unit 205 are performed, and reproduction image is formed onto a piece of transfer paper at the imaging unit 206 after transferring to the image processing processor 204 from the image data control unit 203.

The functions of the digital integrated machine is achieved by bus control at the parallel bus 220 and the image data control unit 203 in the image data flow. The facsimile transmission function performs image processing of the read image data at the image processing processor 204, and transfers the data to the facsimile control unit 224 to the image data control unit 203 and the parallel bus 220. Data conversion of the data for the communication network is performed at the facsimile control unit 224, and the data are sent to the public network (PN) 225 as facsimile data.

On the other hand, as for the received facsimile data, line data from the public network (PN) 225 is converted into image data at the facsimile control unit 224, and transferred to the image processing processor 204 to the parallel bus 220 and the image data control unit 203. In the case, special picture quality processing is not performed, and reproduction images are formed onto apiece of transfer paper at the imaging unit 206 after dot re-arrangement and pulse control at the video data control unit 205.

When a plurality of jobs, for example, copying function, facsimile sending and receiving function, and printer output function are simultaneously operated, the system controller 231 and the process controller 211 control job allocation of the right of using of the reading unit 201, the imaging unit 206 and the parallel bus 220.

The process controller 211 controls the flow of image data, and the system controller 231 controls the whole system and manages the activation of each resource. Moreover, as for function selection of the digital integrated machine, processing contents, such as the copying function and the facsimile function, are set by selection input on the operation panel (operation unit).

The system controller 231 and the process controller 211 communicate each other though the parallel bus 220, image data control unit 203 and the serial bus 210. Specifically, communication between the system controller 231 and the process controller 211 is performed by data format conversion for data interface between the parallel bus 220 and the serial bus 210 at the image data control unit 203.

(Image Processing Unit 103/Image Processing Processor 204)

Figure 3:
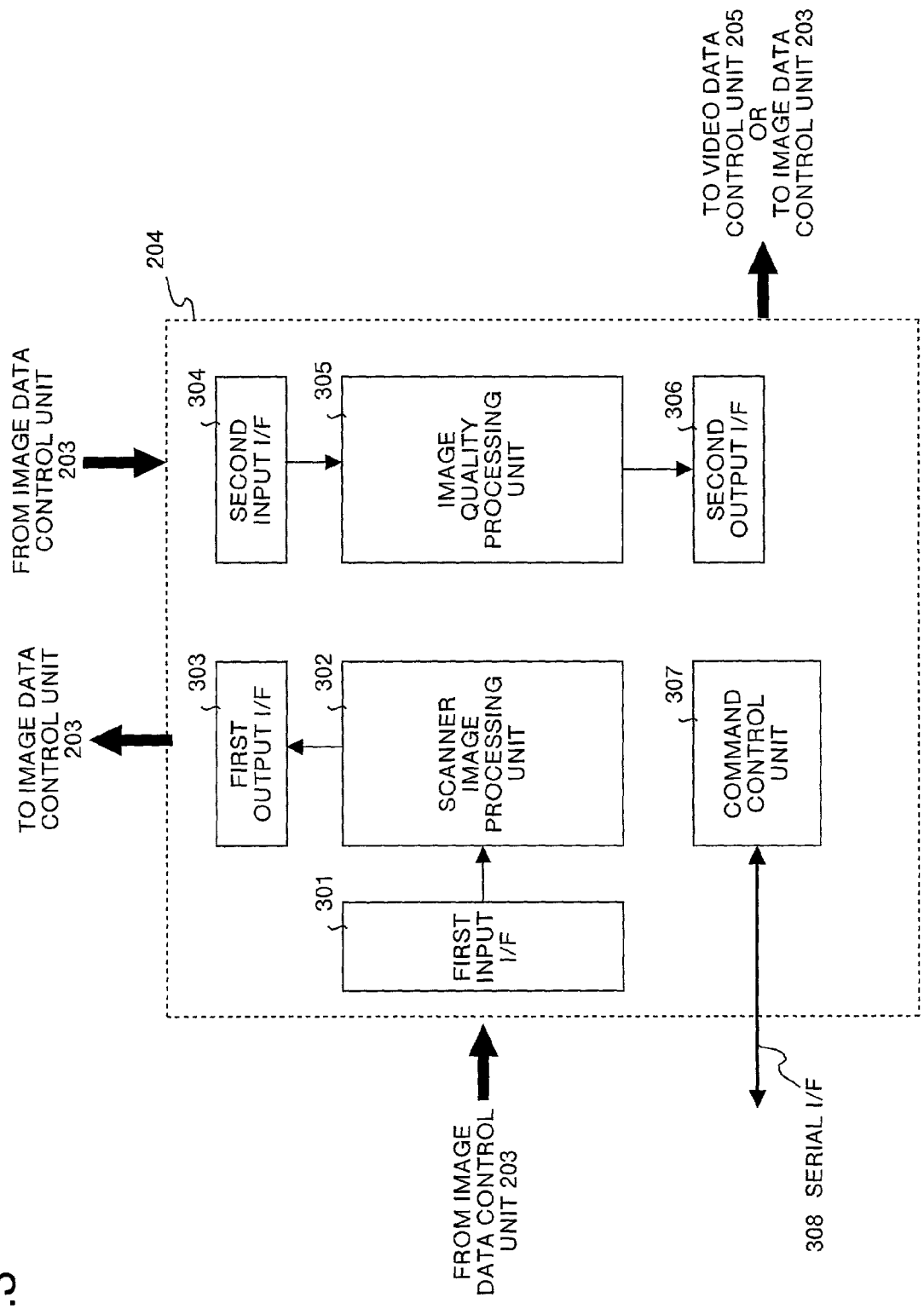
FIG. 3 shows a block diagram of the outline of the processing of an image processing processor in the image processor according to the first embodiment.

The outline of processing at the image processing processor 204 forming the image processing unit 103 will be described. FIG. 3 shows a block diagram of the outline of the processing of the image processing processor 204 in the image processor according to the present embodiment.

In the block diagram of FIG. 3, the image processing processor 204 has a configuration comprising: a first input I/F (interface) 301; a scanner image processing unit 302; a first output I/F 303; a second input I/F 304; a picture quality processing unit 305; and a second output I/F 306.

In the configuration, the read image data is transmitted to the scanner image processing unit 302 from the first input interface (I/F) 301 of the image processing processor 204 through the sensor board unit 202, and the image data control unit 203.

The scanner image processing unit 302 has an object to correct degradation of the read image data, and, specifically, performs shading correction, scanner γ correction and MTF correction, and so on. Size changing of enlargement/reduction may be performed though it is not correction processing. When the correction processing of the read image data is completed, image data is transferred to the image data control unit 203 to the first output interface (I/F) 303.

In the case of output onto a piece of transfer paper, image data from the image data control unit 203 is received through the second input I/F 304, and area gradation is performed at a picture quality processing unit 305. The image data after the picture quality processing is output to the video data control unit 205 or the image data control unit 203 to the second output I/F 306.

The area gradation processing in the picture quality processing unit 305 includes density conversion processing, dither processing, error diffusion processing and so on, and its main processing is area approximation of gradation information. Once the image data processed by the scanner image processing unit 302 are accumulated in the memory module 222, various kinds of reproduction images may be confirmed by changing the picture quality processing with the picture quality processing unit 305.

For example, the atmosphere of the reproduction image maybe easily changed by oscillation (change) of the density of the reproduction image, or by changing the number of lines of dither matrices. In the case, different kinds of processing of the same image data may be quickly executed upon request by reading the accumulated image data from the memory module 222, with no need to repeat reading of image data from the reading unit 201 at every changing of processing.

Moreover, in the case of a single scanner, both the scanner image processing and the gradation processing are performed for output to the image data control unit 203. The processing contents may be changed to programmable ones. Switching of processing, change of processing procedures and so on are managed at the command control unit 307 through a serial I/F 308.

Figure 4:
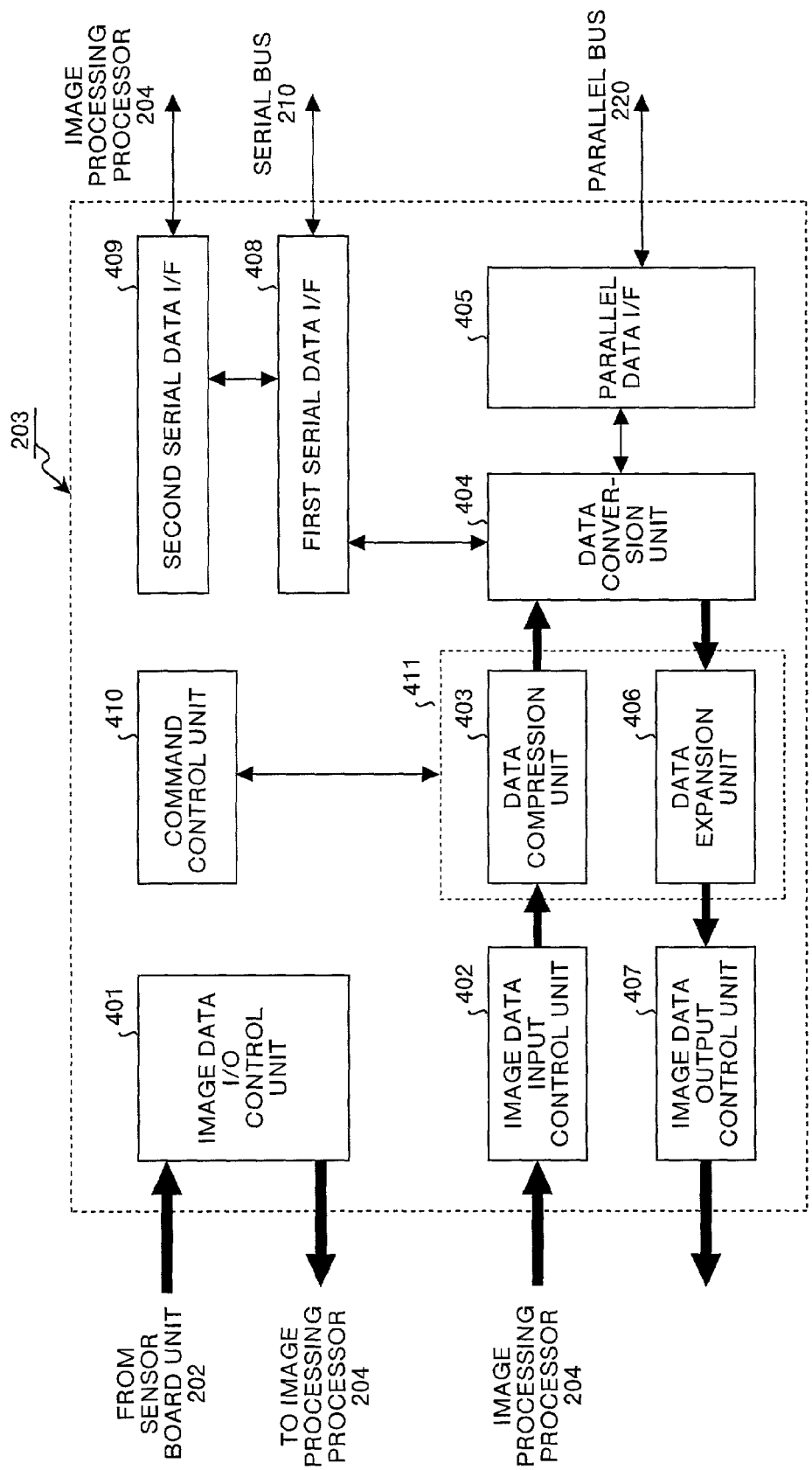
FIG. 4 shows a block diagram of the outline of the processing of an image data control unit in the image processor according to the first embodiment.

The outline of processing at the image data control unit 203 forming the image data control unit 100 will be described. FIG. 4 shows a block diagram of the outline of the processing of the image data control unit 203 in the image processor according to the present embodiment.

In the block diagram of FIG. 4, the image data is input to the image data input/output (I/O) control unit 401 (the control unit 401 receives the image data) from the sensor board unit 202 to output (send) the image data to the image processing processor 204. That is, the image data I/O control unit 401 is a component part to perform connection between the image reading unit 101 and the image processing unit 103 (the image processing processor 204). It may be said that the control unit 401 is a dedicated I/O unit only for sending of image data read at the image reading unit 101 to the image processing unit 103.

Image data after the scanner image correction at the image processing processor 204 is input to the image data input control unit 402 (the control unit 402 receives the data). Data compression processing of the input image data is performed at the data compression unit 403 for improved transfer efficiency in the parallel bus 220. Thereafter, the image data is sent to the parallel bus 220 through a parallel data I/F 405 after passing through a data conversion unit 404. But, the details of the configuration and the operation of the data compression unit 403 will be described later.

The image data, which are input from the parallel bus 220 through the parallel data I/F 405, are sent to a data expansion unit 406 to the data conversion unit 404 for data expansion processing, as the data are compressed for the bus transfer. The expanded image data are processed in an image data output control unit 407 for transfer to the image processing processor 204. But, the details of the configuration and the operation of the data expansion unit 406 will be described later.

Moreover, the image data control unit 203 is also provided with a conversion function between parallel data and serial data. The system controller 231 transfers data to the parallel bus 220, and the process controller 211 transfers data to the serial bus 210. The image data control unit 203 performs data conversion for communication between two controllers.

The serial data I/F is provided with a first serial data I/F 408 for data communication with a process controller to the serial bus 210; and a second serial data I/F 409 used for data communication with the image processing processor 204. Smoothing of the interface operation with the image processing processor 204 may be realized by the independent line to/from the image processing processors 204.

A command control unit 410 controls operations of each component part in the image data control unit 203, and of each interface according to the input instructions. Especially, the control unit 410 performs operation control of a data compression expansion unit 411 comprising the data compression unit 403 and the data expansion unit 406. The contents of the control will be described later.

Figure 5:
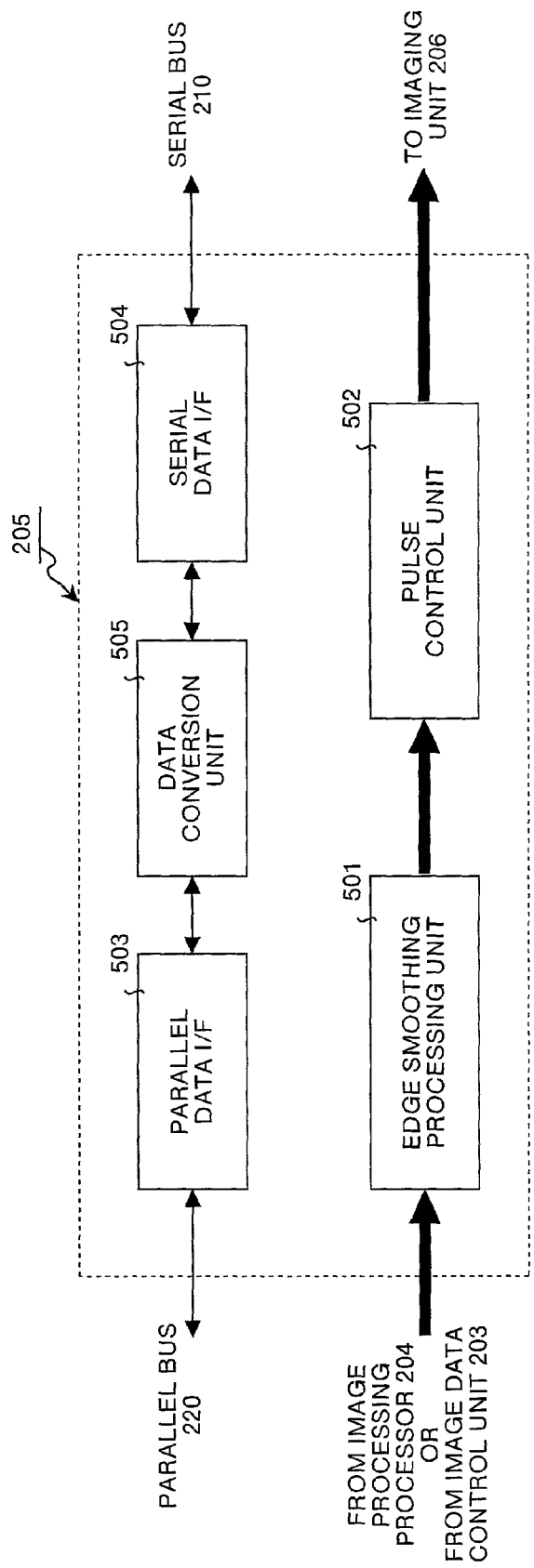
FIG. 5 shows a block diagram of the outline of the processing of a video data control unit in the image processor according to the first embodiment.

The outline of processing at the video data control unit 205 forming a part of the image writing unit 104 will be described. FIG. 5 shows a block diagram of the outline of the processing of the video data control unit 205 in the image processor according to the present embodiment.

In the block diagram of FIG. 5, the video data control unit 205 performs additional processing of the input image data according to the characteristics of the imaging unit 206. That is, the edge smoothing processing unit 501 performs dot re-arrangement processing by edge smoothing processing; a pulse control unit 502 performs pulse control of image signal for the dot formation; and the image data after the processing are output to the imaging unit 206.

As format conversion function between parallel data and serial data is provided, independent of the image data conversion, the video data control unit 205 may independently perform communication with the system controller 231 and the process controller 211. That is, format conversion of the both data is performed by provision of the parallel data I/F 503 to send and receive the parallel data; the serial data I/F 504 to send and receive the serial data; and a data conversion unit 505 to convert parallel data to serial data and vice versa for the received data at the parallel data I/F 503, and the serial data I/F 504.

Figure 6:
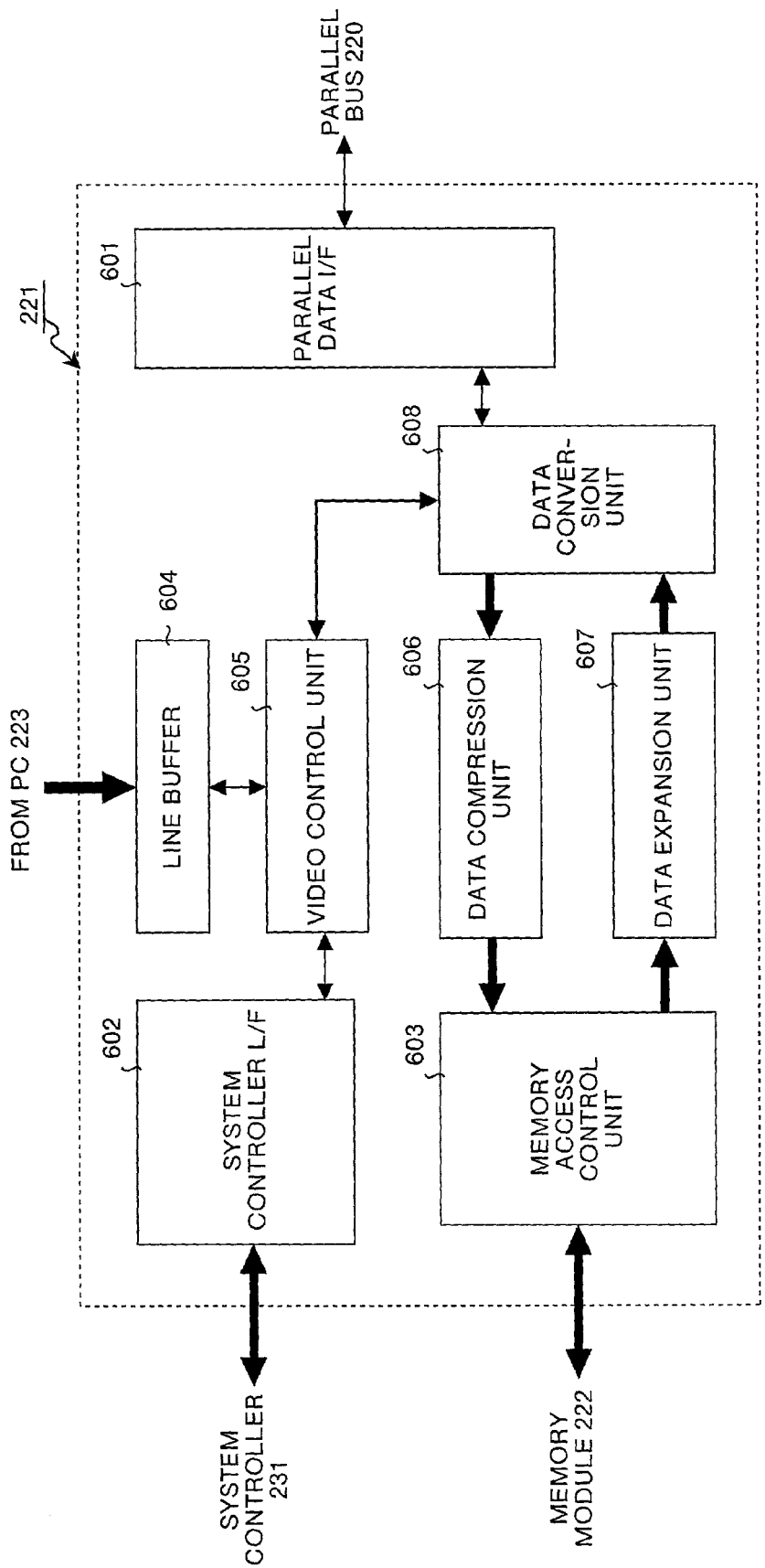
FIG. 6 shows a block diagram of the outline of the processing of an image memory access control unit in the image processor according to the first embodiment.

The outline of processing at the image memory access control unit 221 forming a part of the image memory control unit 102 will be described. FIG. 6 shows a block diagram of the outline of the processing of the image memory access control unit 221 in the image processor according to the present embodiment.

In the block diagram of FIG. 6, the image memory access control unit 221 manages the image data interface with the parallel bus 220; controls the image data access to the memory module 222, that is, storage (write)/read; and also controls the expansion of code data input mainly from the external PC 223 to image data.

Therefore, the image memory access control unit 221 has a configuration comprising: a parallel data I/F 601; a system controller I/F 602; a memory access control unit 603; a line buffer 604; a video control unit 605: a data compression unit 606; a data expansion unit 607; and a data conversion unit 608.

Here, the parallel data I/F 601 manages the image data interface with the parallel bus 220. The memory access control unit 603 controls the image data access to the memory module 222, that is, storage (write)/read.

Moreover, the input code data are stored as data in a local area at the line buffer 604. The code data stored in the line buffer 604 are expanded to image data in the video control unit 605, based on the expansion processing instruction, which is input to the system controller I/F 602, from the system controller 231.

The expanded image data or the image data input from the parallel bus 220 are stored in the memory module 222 to a parallel data I/F 601. In the case, image data to be stored is selected at the data conversion unit 608; data compression is performed to improve the memory use efficiency at the data compression unit 606; and the image data are stored (written) in the memory module 222 under management of the addresses in the memory module 222 by the memory access control unit 603.

At reading the image data stored (accumulated) in the memory module 222, the addresses for the reading end are controlled at the memory access control unit 603, and the read image data are expanded in the data expansion unit 607. When the expanded image data are transferred to the parallel bus 220, the data transfer is performed to the parallel data I/F 601.

Figure 7:
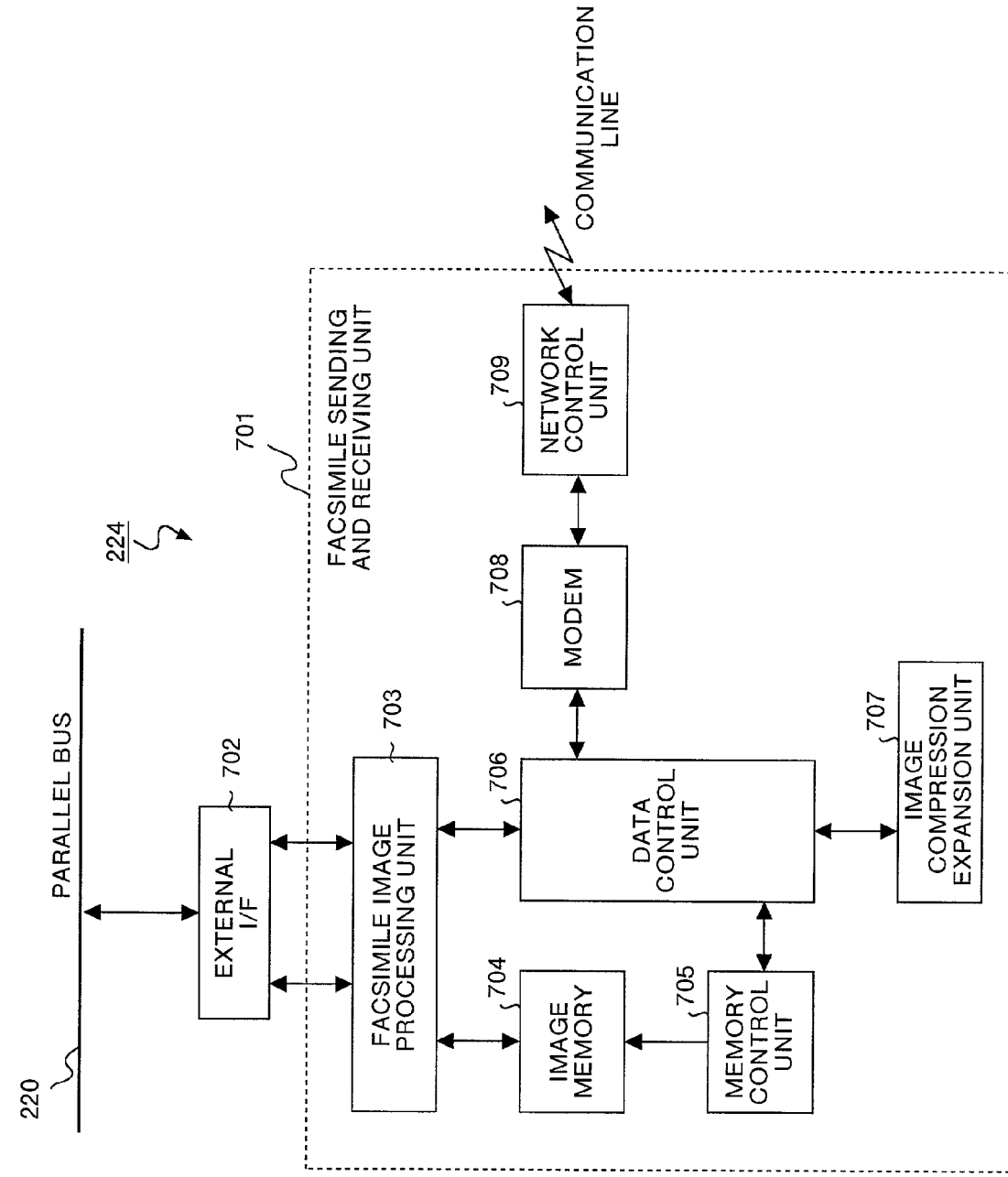
FIG. 7 shows a block diagram of the configuration of a facsimile control unit 224 in the image processor according to the first embodiment.

The functional configuration of the facsimile control unit 224 will be described. FIG. 7 shows a block diagram of the configuration of the facsimile control unit 224 in the image processor according to the present embodiment.

In the block diagram of FIG. 7, the facsimile control unit 224 comprises a facsimile sending and receiving unit 701, and an external I/F 702. Here, the facsimile sending and receiving unit 701 sends image data to an external line after conversion into a communication form, and the data from the external are restored to image data for storage and output in the imaging unit through an external I/F 702 and the parallel bus 220.

The facsimile sending and receiving unit 701 has a configuration comprising: a facsimile image processing unit 703; an image memory 704; a memory control unit 705; a data control unit 706; an image compression expansion unit 707: a modem 708, and a network control unit 709.

As for facsimile image processing, binary smoothing processing of the received image is performed at the edge smoothing processing unit 501 in the video data control unit 205 shown in FIG. 5. Moreover, as for the image memory 704, a part of the output buffer function is performed at the image memory access control unit 221 and the memory module 222.

In this facsimile sending and receiving unit 701, a data control unit 706 gives instructions to an memory control unit 705 for sequential reading of the accumulated image data in an image memory 704, when the transmission of the image data is started. The read image data are restored to the original signal by the facsimile image processing unit 703, and added to the data control unit 706 after density conversion processing and size changing.

Code compression of the image data added to the data control unit 706 is performed by an image compression expansion unit 707, and sent to a destination end through the network control unit 709, after modulation at the modem 708. And the image information after completion of sending is deleted from the image memory 704.

At receiving, received image is accumulated in the image memory 704 for the time being, and recorded and output when receiving of one piece of image is completed, if it is possible to record and output it at that time. Moreover, when receiving is started based on calling for copying operation, the received images are accumulated in the image memory 704 before the use rate of the image memory 704 becomes a predetermined value, for example, 80%; and writing operation under execution is forced to be stopped, and the received images are read from the image memory 704 for record and output, when the rate of the image memory 704 reaches 80%.

At this time, the received images read from the image memory 704 are deleted from the image memory 704. When the use rate of the image memory 704 is reduced to a predetermined value, for example, to 10%, the stopped writing operation is restarted; and when all the writing operations are completed, the remaining received images are recorded and output. Moreover, various kinds of parameters for writing operation at interrupting are internally saved so as restart after interrupting the writing operation and the parameters are internally reset at restarting.

Figure 8:
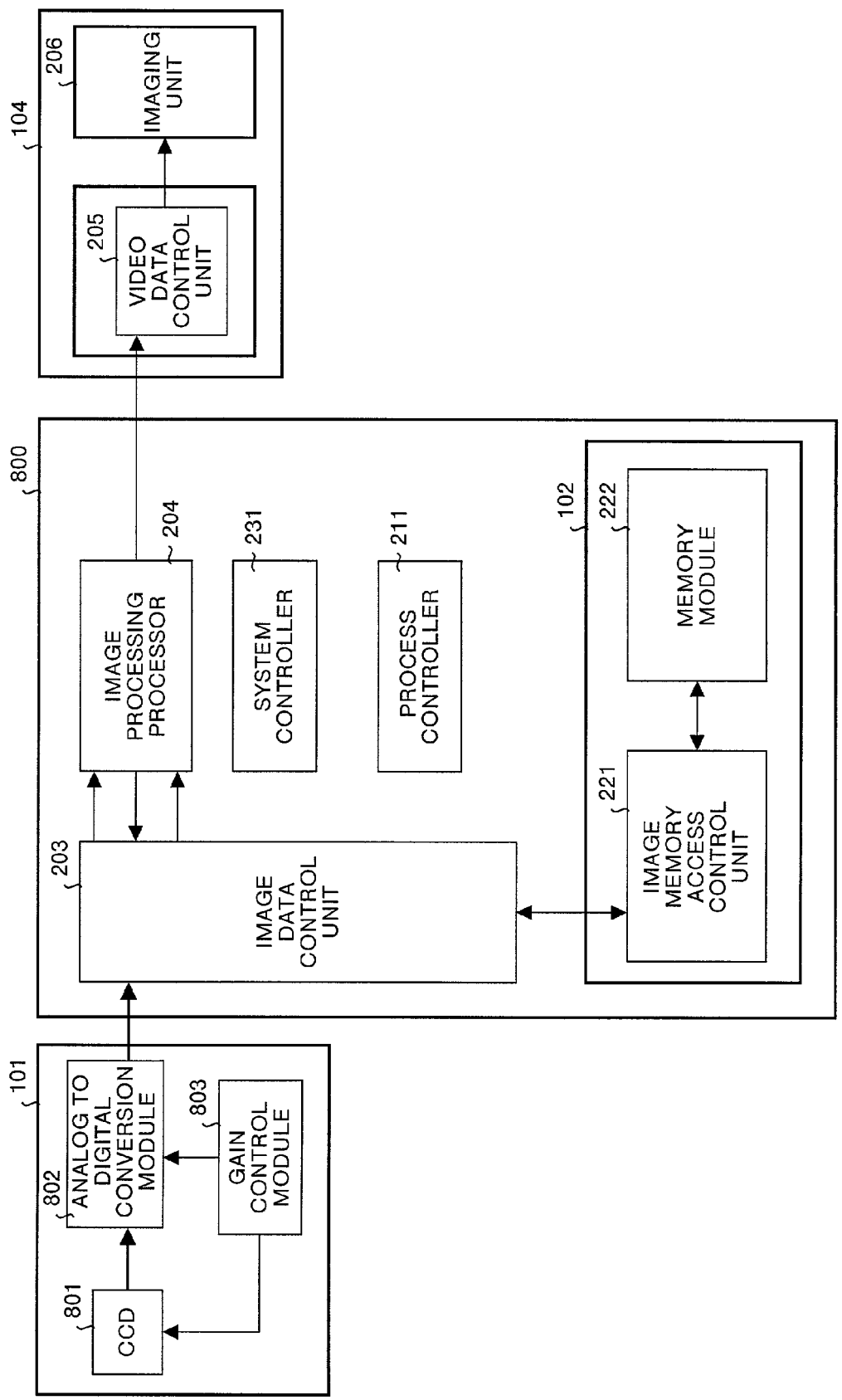
FIG. 8 shows a block diagram of the configuration of the units in the case of a digital integrated machine as the image processor.

The configuration of units in the image processor according to the present embodiment will be described. FIG. 8 shows a block diagram of the configuration of the units in the image processor according to the present embodiment.

As shown in FIG. 8, the digital integrated machine comprises three units, that is, the image reading unit 101, an image engine control unit 800, and the image writing unit 104, and each unit may be managed respectively by an independent PCB substrate.

The image reading unit 101 comprises a CCD 801, an analog to digital conversion module 802, a gain control module 803, and so on, and performs conversion of optical image information, which is optically read, into digital image signals.

An image engine control unit 800 mainly comprises: the system controller 231, the process controller 211, and the memory module 222 in the image memory control unit 102, Moreover, the unit 800 deals the image processing processor 204, the image memory access control unit 221 and the image data control unit 203 as one component.

The image writing unit 104 has a configuration where it includes the imaging unit 206 with the video data control unit 205 as a main component.

There is no need to change other units in the system of the digital integrated machine, when the specifications and the performances of the image reading unit 101 are changed, as data and interfaces are maintained by changing only image reading unit 101. And it may be possible to restructure the system by changing only the image writing unit 104 when the imaging unit (engine) 206 is changed.

As described above, as the system comprises units which depend on the I/O devices, with independent configurations, up-grading of the system may be realized only by exchange of a minimum numbers of units as far as the data interface is maintained.

In the configuration of the image engine control unit 800 shown in FIG. 8, the image processing processor 204, the image data control unit 203, and the image memory access control unit 221 comprises independent modules (component parts), respectively. Therefore, conversion of the image engine control unit 800 to a controller may be realized by deletion of unnecessary modules, and universal use of necessary modules as common modules. Thereby, similar functions between functions for the image engine control and ones for the controller may be realized by use of common modules without independently making modules for both the objects.

The compression processing of the image data in the image processor according to the present embodiment will be described. Here, the configuration and the operation of the data compression unit 403 (See FIG. 4) in the image data control unit 203 will be described, and the data compression unit 606 (See FIG. 6) in the image memory access control unit 221, or the image compression expansion unit 707 in the facsimile sending and receiving unit 701 may have the similar configuration to the above one.

Figure 9:
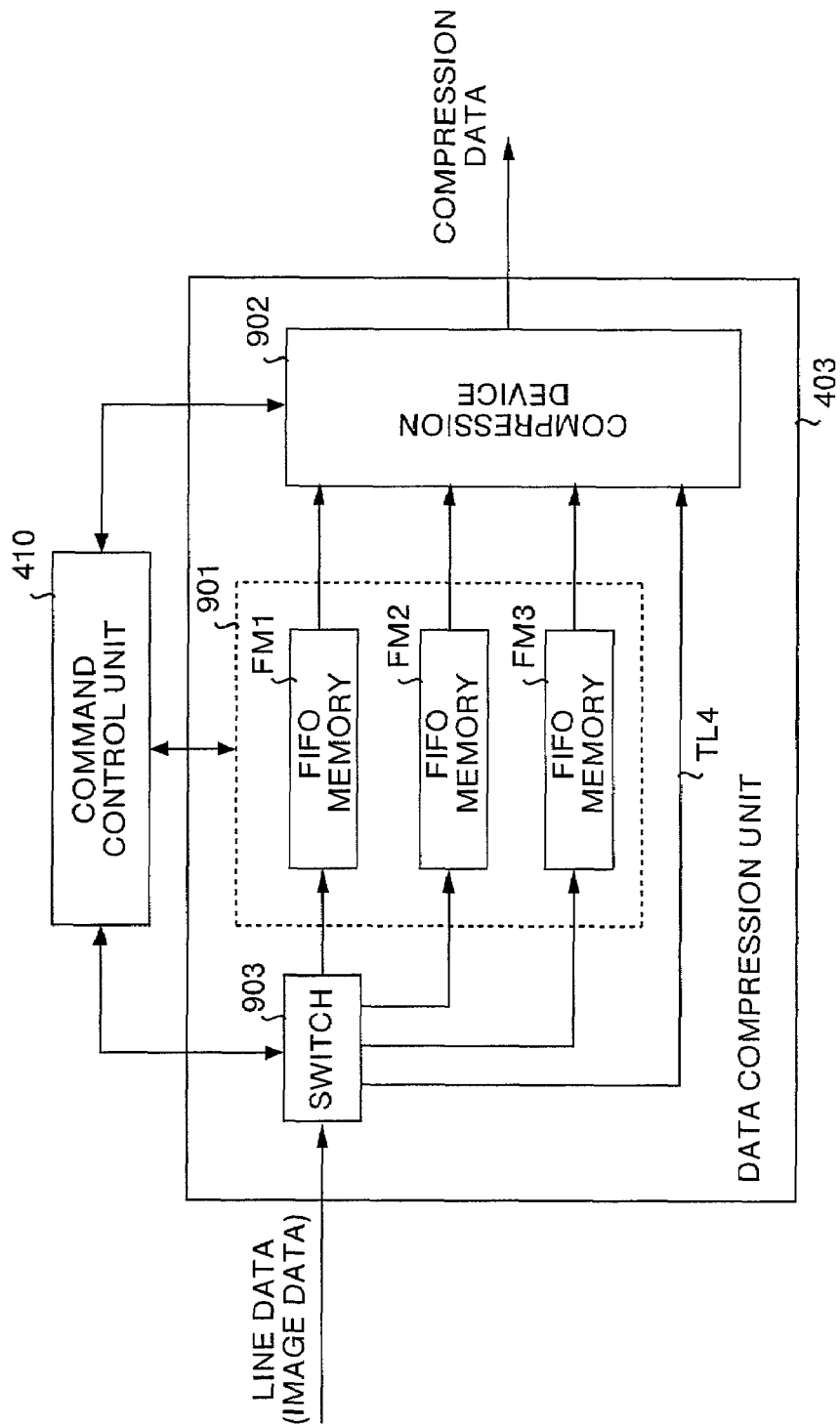
FIG. 9 shows a block diagram of the configuration of a data compression unit in the image processor according to the first embodiment.
Figure 10:
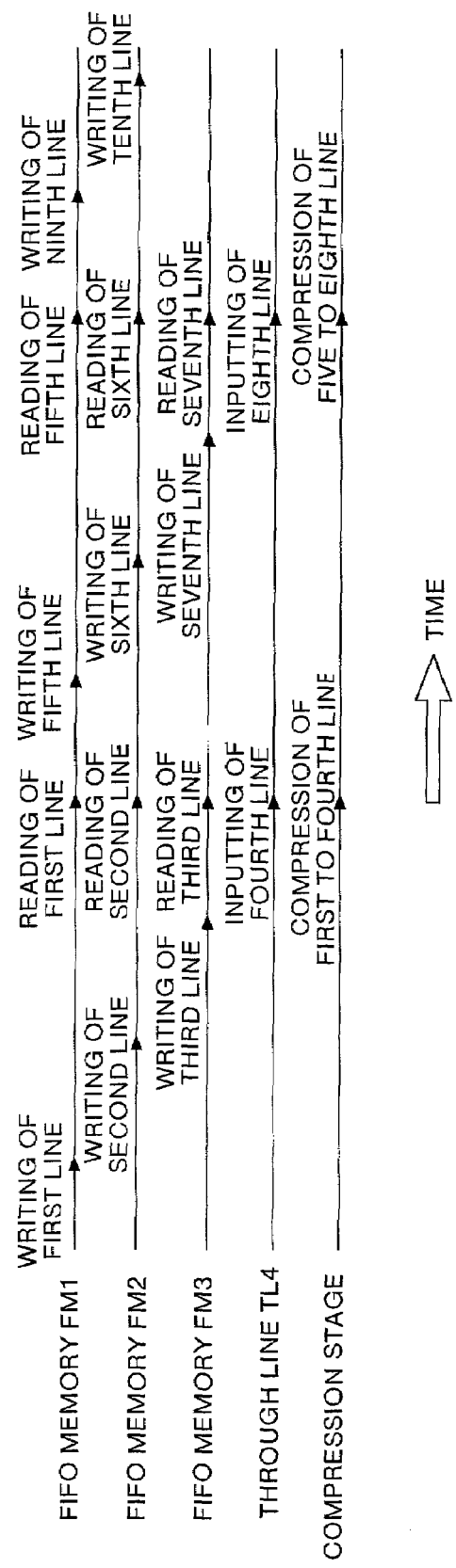
FIG. 10 shows an explanatory view of the processing timing of the data compression unit in the image processor according to the first embodiment.

In the first place, the configuration and the operation of the data compression unit 403 will be described. FIG. 9 shows a block diagram of the configuration of the data compression unit 403 in the image processor according to the present embodiment. FIG. 10 shows an explanatory view of the processing timing of the data compression unit 403.

In FIG. 9, the data compression unit 403 comprises: a group of line memories 901 having 1-port FIFO memories FM1, FM2, and FM3; a compression device 902 to compress image data; a circuit TL4 to send image data to the compression device 902 as it is; a switch 903 to switch the output end of the image data to be input; and a command control unit 410 to control the group of line memories 901, the compression device 902, the switch 903. Hereinafter, a circuit to send image data as it is assumed to be called as a through line.

Figure 18:
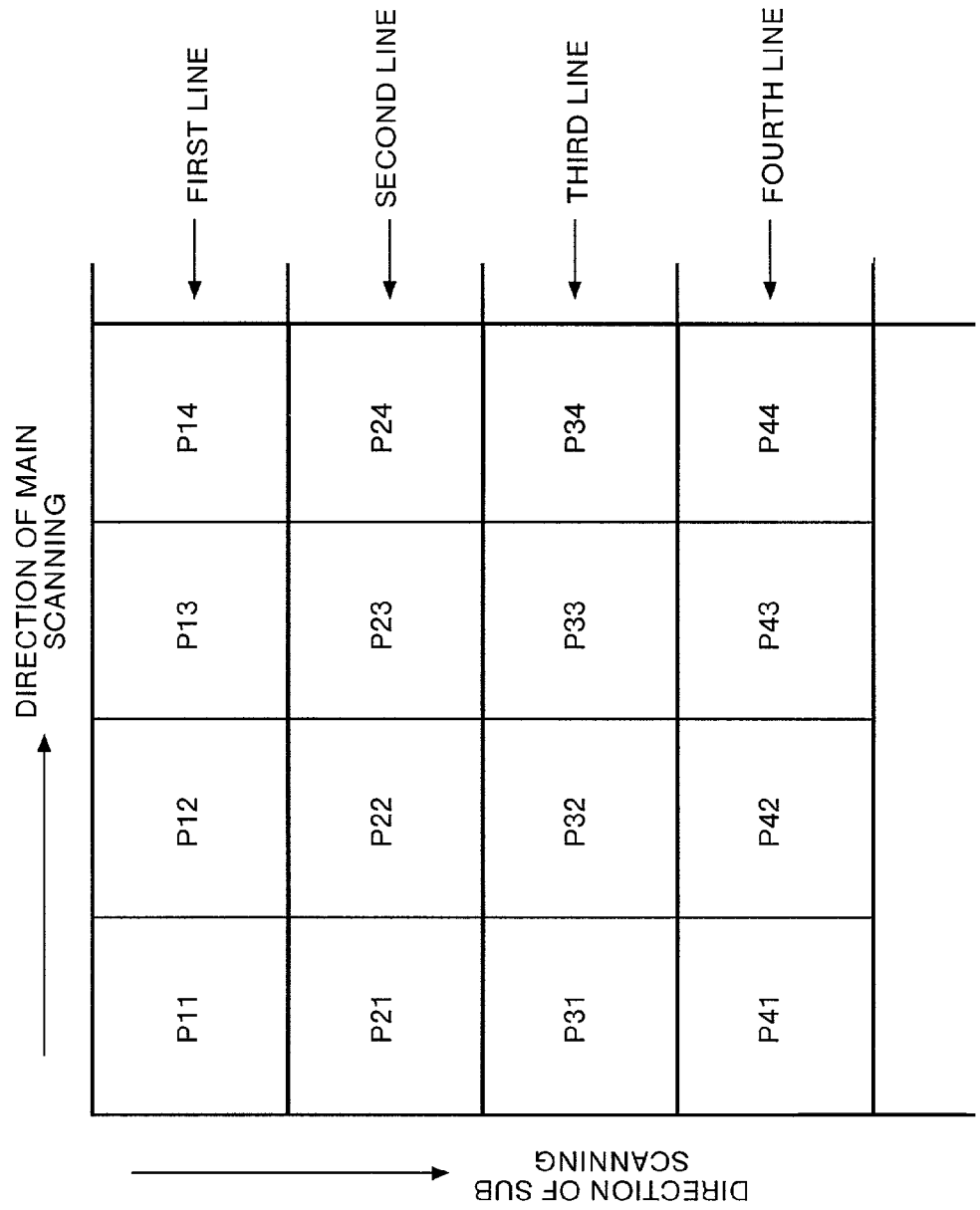
FIG. 18 shows a view of an image data compressed in the conventional data compression unit shown in FIG. 16.

Moreover, in order to simplify the description, a compression area for compression with the compression device 902 is assumed to be a rectangular area of four lines×four pixels per one line having four pixels in the main scanning (pixel) direction, and four lines in the sub scanning (line) direction, as shown in FIG. 18. Depending on a usage, the area may be, for example, an area of eight lines×eight pixels per one line in a similar way to that of the DCT (discrete cosine transformation) adopted in the MPEG (Motion Picture Expert Group) method as a compression-decompression standard for moving pictures. That is, the size of the compression area depends on used hardware and applications, and it is not limited to the area of four lines×four pixels per one line.

For compression of image data, image data output from the image processing processor 204 is input, in the first place. As the image data is continuously input to the switch 903, the switch 903 sends the first four pixels (P11, P12, P13, P14) of image data (the first line of image data) to the FIFO memory FM1; the output end is switched to the FIFO memory FM2 at input of the next one pixel (the fifth pixel: P21) of image data; and then the switch 903 sends the four pixels of image data (the second line of image data) including the concerned pixel to the FIFO memory FM2.

Similarly, the switch 903 switches the output end to the FIFO memory FM3 at input of the ninth pixel (P31) of image data, and sends the four pixels of image data (the third line of image data) including the concerned pixel to the FIFO memory FM3.

Then, the switch 903 switches the output end to the through line TL4 at input of the next 13th pixel (P41) of image data, and sends the four pixels of image data (the fourth line of image data) including the concerned pixel directly to the compression device 902. At the same time, the switch 903 reads the first through the third lines of image data stored in the FIFO memories FM1, FM2, and FM3, respectively, under control of the command control unit 410 to send them to the compression device 902 (See FIG. 10).

The compression device 902 performs batch compression of the first to the fourth lines of image data which are input. Batch compression of the image data of four lines×four pixels per one line is realized by the above operations. The compressed data are output to the image processing processor 204 under control of the command control unit 410.

On the other hand, the switch 903 switches the output end of the image data to the FIFO memory FM1 to send the fifth line of image data to the FIFO memory FM1 at input of the 17th pixel of image data. The sixth and the seventh lines of image data is sequentially sent to the FIFO memories FM2 and FM3. The eighth line of image data is sent directly to the compression device 902, and, at the same time, the fifth, sixth, and seventh lines of data stored in the FIFO memories FM1, FM2, and FM3 are sent to the compression device.

Figure 16:
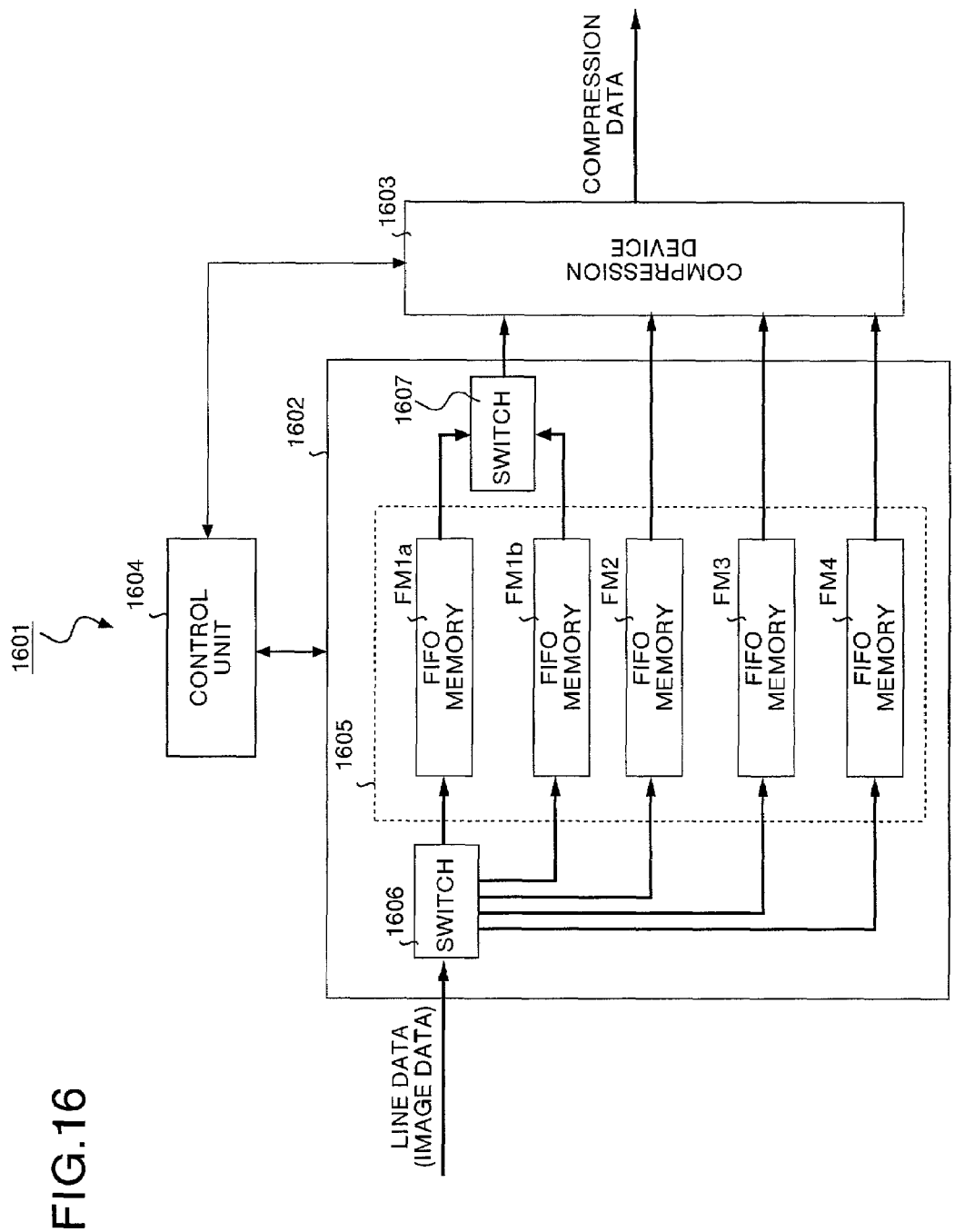
FIG. 16 shows a block diagram of an example of the configuration of a conventional data compression unit.
Figure 17:
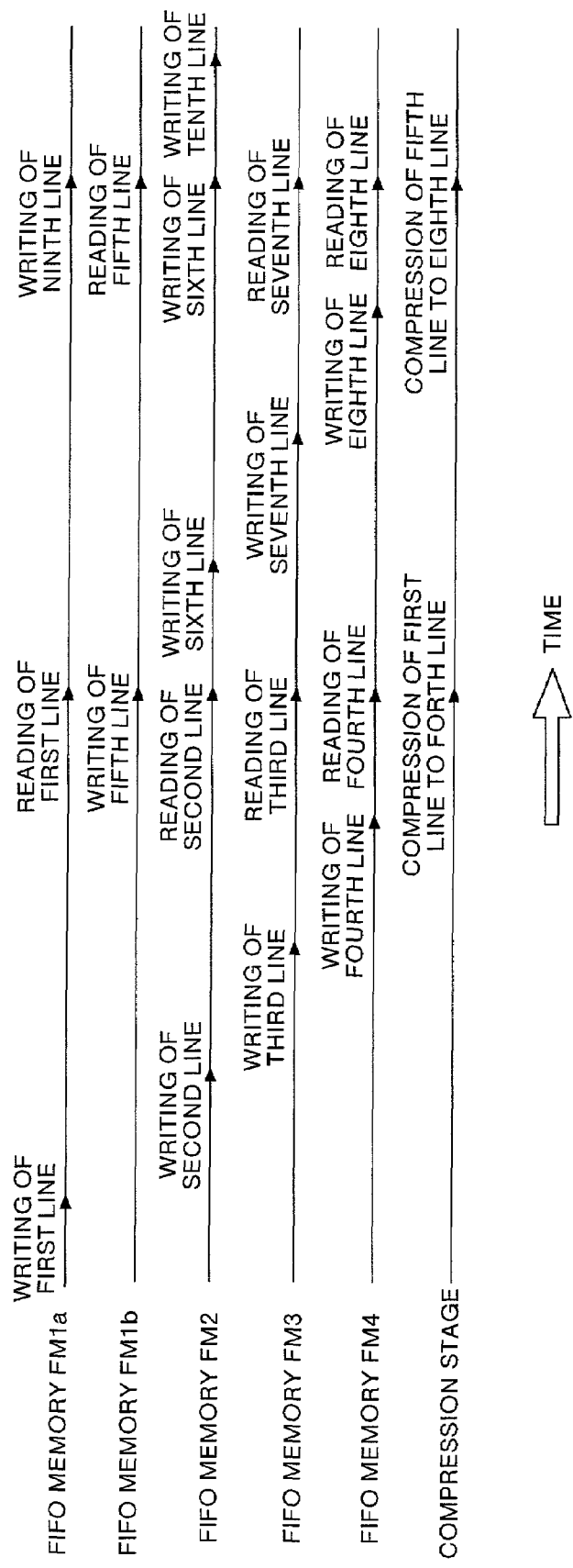
FIG. 17 shows an explanatory view of the processing timing for the conventional data compression unit.
Figure 19:
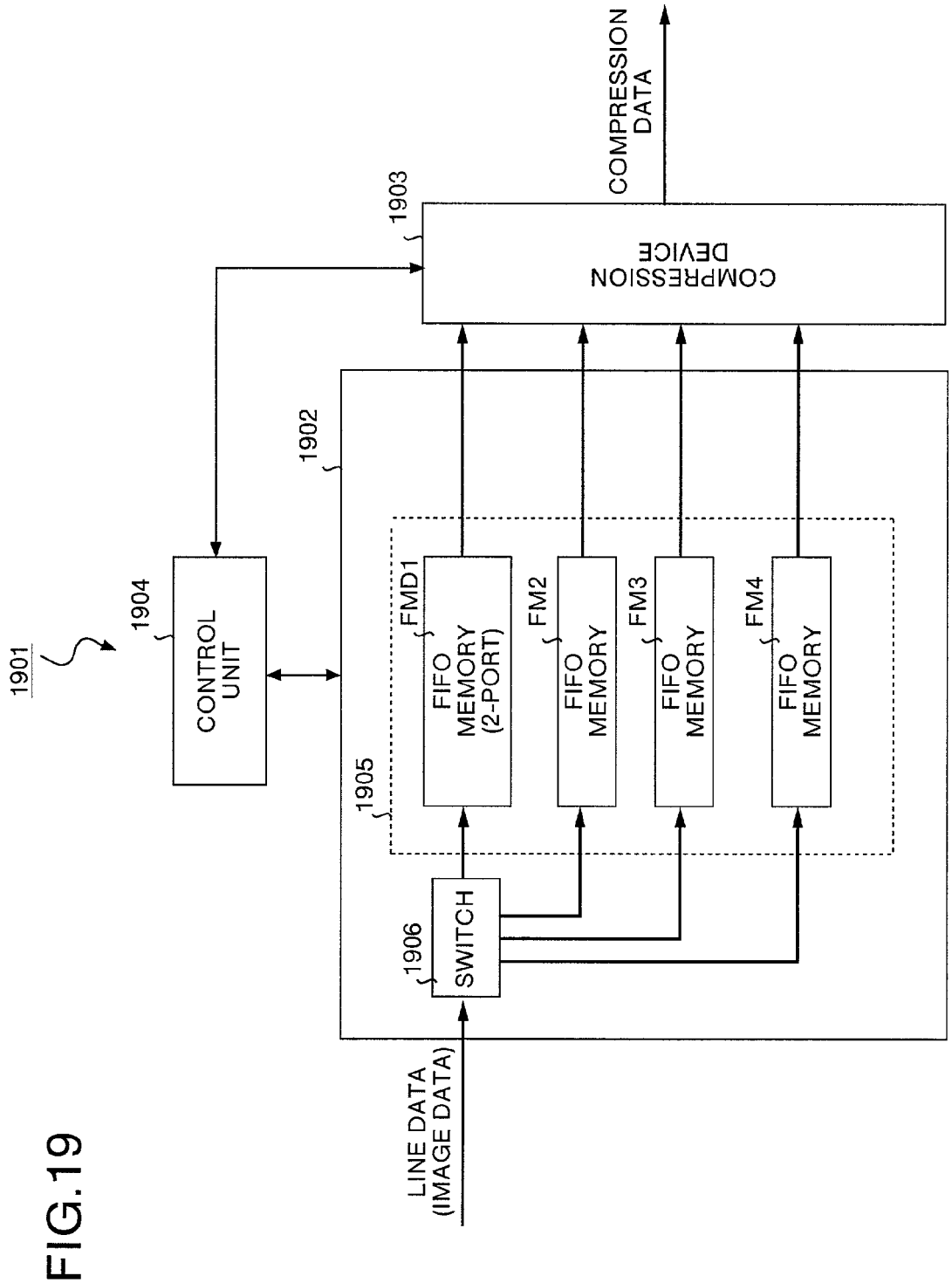
FIG. 19 shows an example of the configuration of a data compression unit using a 2-port FIFO memory for a part.
Figure 20:
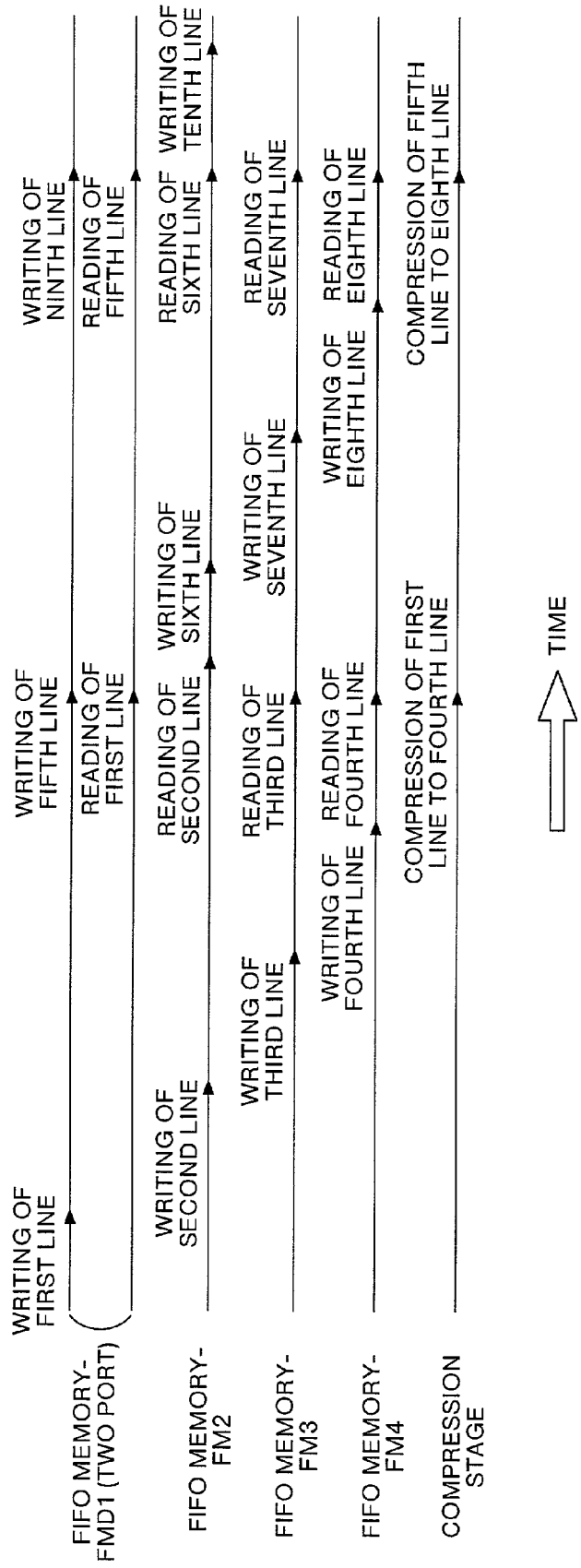
FIG. 20 shows an explanatory view of the processing timing of the conventional data compression unit shown in FIG. 19.

Hereinafter, image data continuously input from the image processing processor 204 may be smoothly compressed by repetition of similar control as explained above. The data compression unit 403 may have less number of 1-port FIFO memories than those of the data compression unit 1601 (See FIG. 16) according to conventional techniques by two memories, and less number of 2-port FIFO memories than those of the data compression unit 1901 (See FIG. 19) by one memory.

Depending on a usage, it may be possible to reduce the number of memories, in comparison with those of the data compression unit 1601 according to conventional techniques by one line of memories, even by replacing the group of line memories 901 with memories storing (n−1) lines of image data without using line memories. Moreover, a simpler control method may be used than that of the case using a single memory independently designed, and easier circuit design and smaller device size may be also realized, by using the group of line memories 901.

The expansion processing of image data in the image processor according to the present embodiment will be described. Here, the configuration and the operation of the data expansion unit 406 (See FIG. 4) in the image data control unit 203 will be described, and the data expansion unit 607 (See FIG. 6) in the image memory access control unit 221, or the image compression expansion unit 707 (See FIG. 7) in the facsimile sending and receiving unit 701 may have the similar configuration as explained above.

Figure 11:
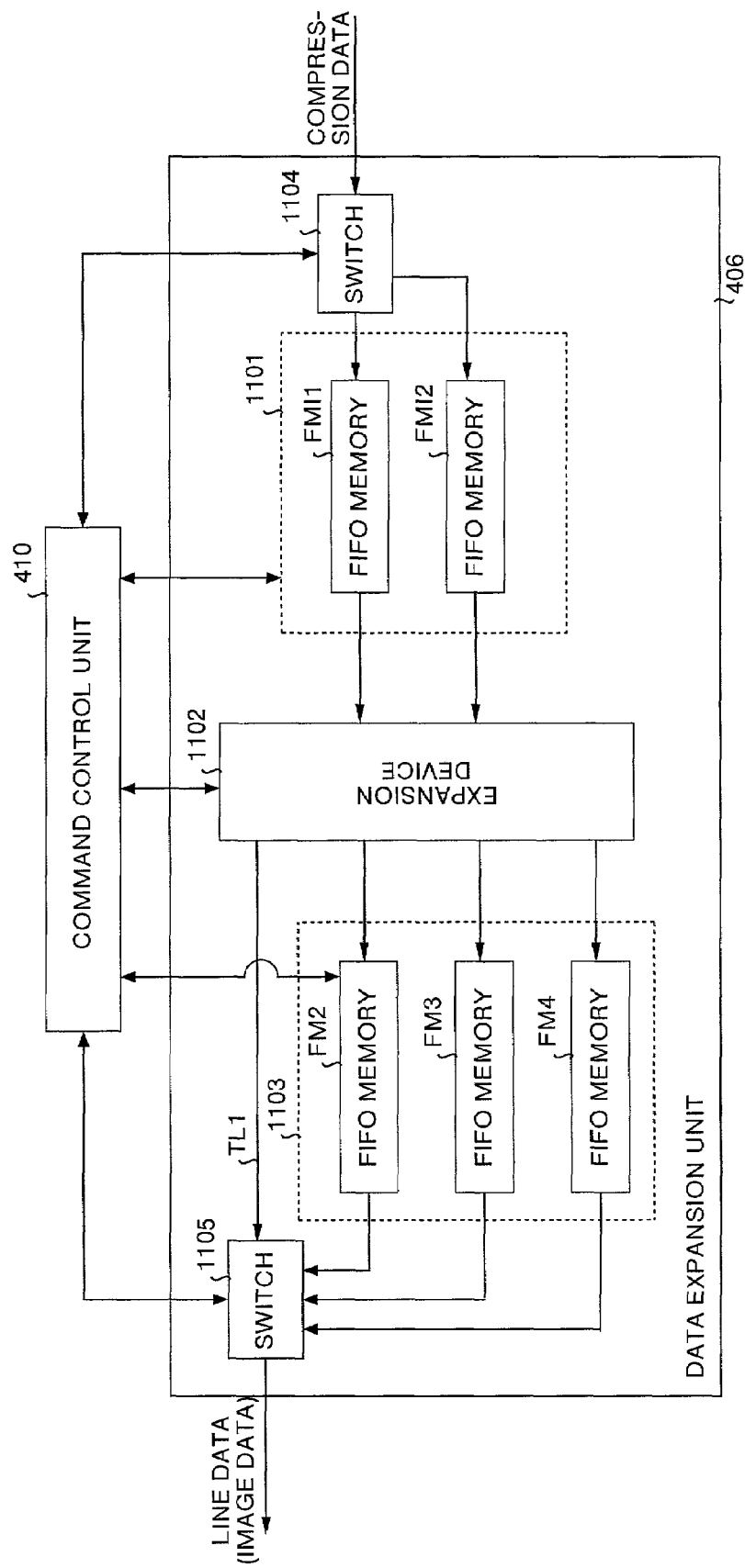
FIG. 11 shows a block diagram of the configuration of a data expansion compression unit in the image processor according to the first embodiment.
Figure 12:
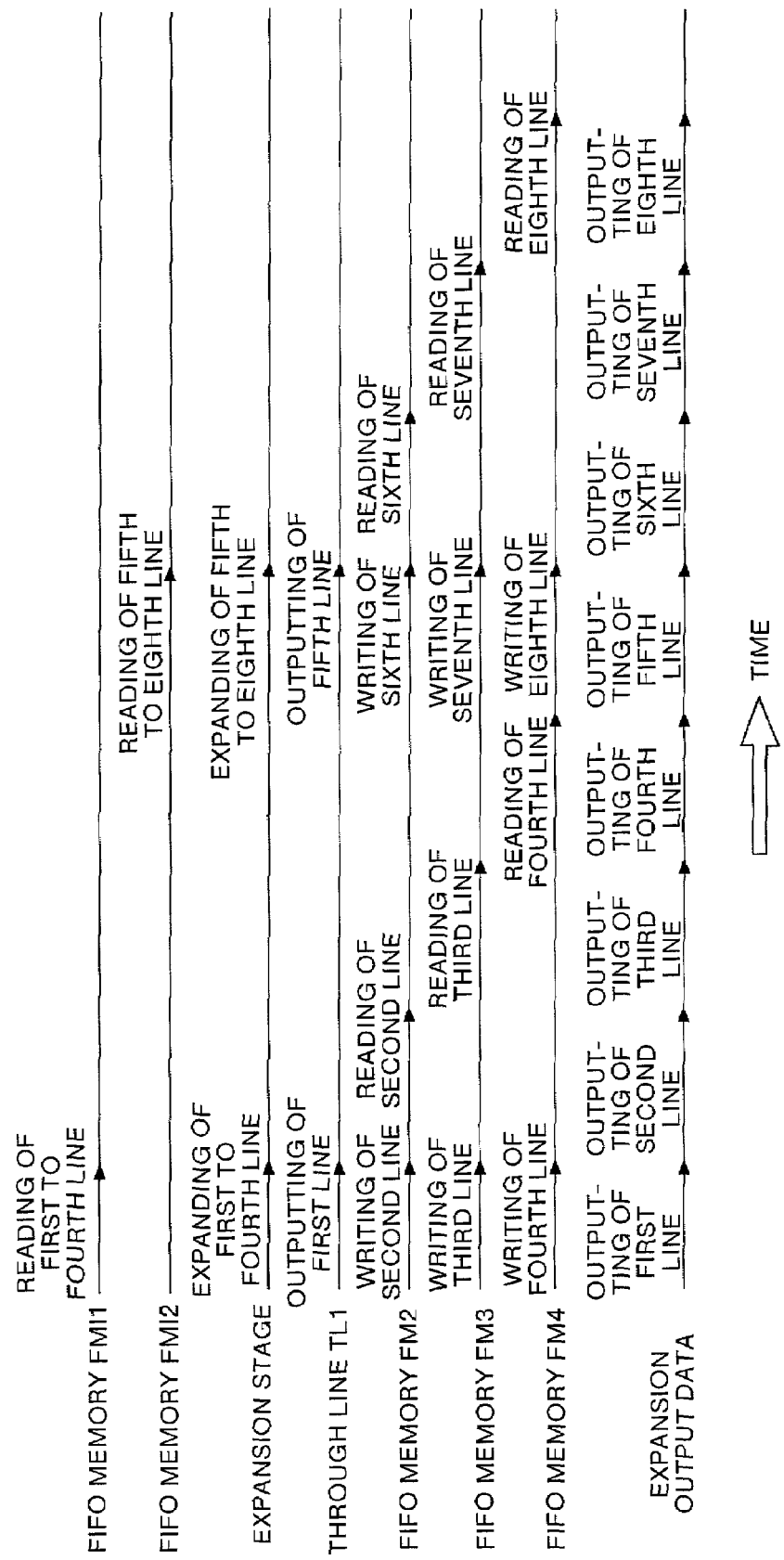
FIG. 12 shows an explanatory view of the processing timing of the data expansion unit in the image processor according to the first embodiment.

In the first place, the configuration and the operation of the data expansion unit 406 will be described. FIG. 11 shows a block diagram of the configuration of the data expansion compression unit 406 in the image processor according to the present embodiment. FIG. 12 shows an explanatory view of the processing timing of the data expansion unit 406.

In FIG. 11, the data expansion unit 406 comprises: a group of input side memories 1101 having 1-port FIFO memories FMI1, and FMI2 storing image data compressed every four line×four pixels per one line; an expansion device 1102 to expand the compressed image data; a group of output side memories 1103 having 1-port FIFO memories FM2, FM3, and FM4 storing the expanded image data; a switch 1104 to switch the output end of the compressed image data to either FMI1, or FMI2; a switch 1105 to switch the input end of the expanded image data; and a circuit of a through line TL1 to send the image data output from the expansion device 1102 directly to the switch 1105.

Moreover, the command control unit 410 controls the group of input side memories 1101; the expansion device 1102; the group of output side memories 1103; and switches 1105, and 1106.

As shown in FIG. 12, in the first place, image data is sequentially input through the parallel bus 220 (See FIG. 4) for expansion of the image data. The image data are, for example, the compressed image data stored in the memory module 222 (See FIG. 2) after batch compression of four lines of image data with four pixels per one line.

The input image data are stored using the switch 1104, so as to, for example, store image data to the FIFO memory FMI1, then the next image data to the FIFO memory FMI2.

The expansion device 1102 performs batch expansion of the first to four lines of compressed data input from the FIFO memory FMI1.

Among the expanded data, the first line of expanded data are sent directly to the switch 1105 through the through line TL1, and the second through four lines of image data are sent, respectively, to the FIFO memories FM2, FM3, and FM4, under control of the command control unit 410.

At completion of sending the first line of image data, which are expanded by the expansion device 1102, from the switch 1105, the command control unit 410 switches the input end of the image data for the switch 1105 to the FIFO memory FM2, and, at the same time, controls to read the second line of image data from the FIFO memory FM2. By such control, the image data may be continuously output from the data expansion unit 406. In a similar way, the third and fourth lines of image data are sent to the outside of the data expansion unit 406.

After completion of reading of the fourth line of image data form the FIFO memory FM4, the command control unit 410 sends the fifth to eighth lines of image data, which have been previously stored in the FIFO memory FMI2, to the expansion device 1102. The expansion device 1102 performs batch expansion of the fifth to eighth lines of image data. Moreover, the device 1102 sends the fifth line of image data directly to the switch 1105, and stores the ninth to 12th lines of data, respectively, in the FIFO memories FM2 to FM4. The above stored data are sequentially read and sent to the outside of the data expansion unit 406, under control of the command control unit 410.

Figure 21:
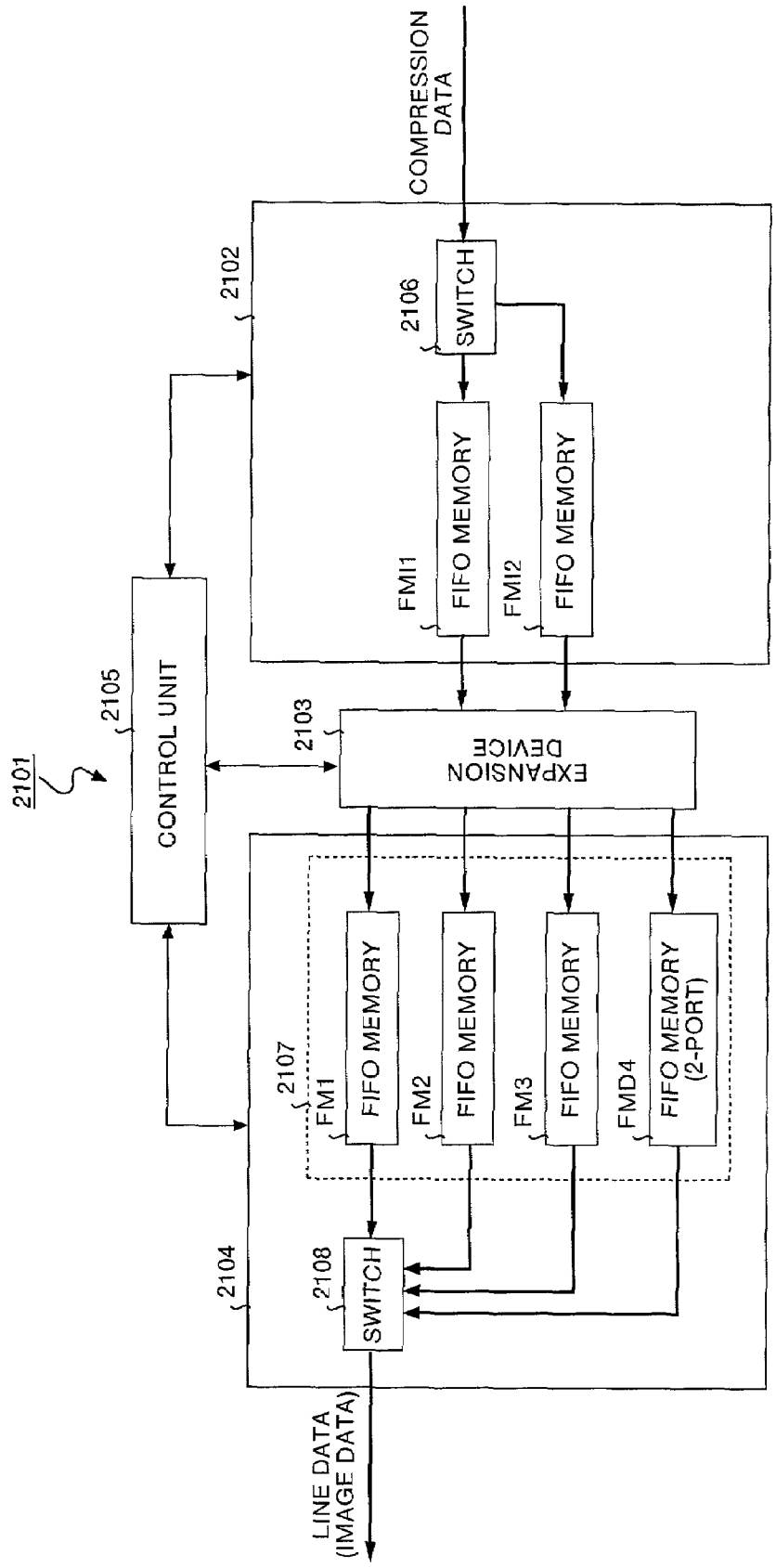
FIG. 21 shows a block diagram of an example of the configuration of a conventional data expansion unit.
Figure 22:
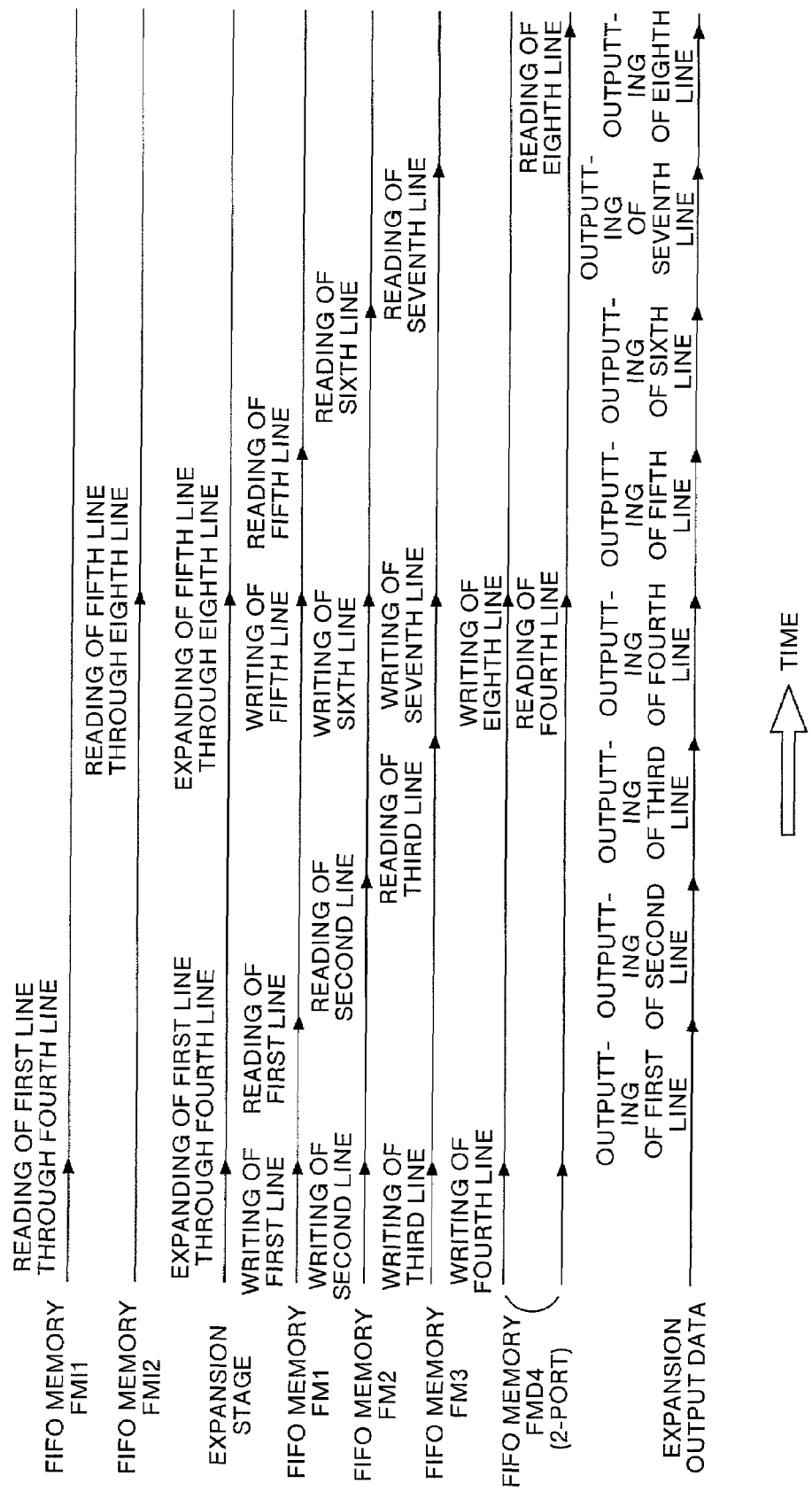
FIG. 22 an explanatory view of the processing timing of the conventional data expansion unit shown in FIG. 21.

The data expansion unit 406 according to the present embodiment may reduce the number of the 1-port FIFO memories by the control in comparison with those of the data expansion unit 2101 (See FIG. 21), and replace 2-port FIFO memory with a 1-port FIFO memory to reduce the circuit size.

Depending on a usage, it may be possible to reduce the number of memories, in comparison with those of the data compression unit 2101 according to conventional techniques by one line of memories, even by replacing the group of output side memories 1103 with memories storing (n−1) lines of image data without using line memories. Moreover, a simpler control method may be used than that of the case using a single memory independently designed, and easier circuit design and smaller device size may be also realized, by using the group of output side memories 1103.

A second embodiment will now be explained. In this second embodiment, an image processor with a further smaller circuit scale in the data expansion unit will be described. Here, in the present embodiment, parts similar to those previously described with reference to the first embodiment are denoted by the same reference numbers, and the description will be eliminated.

Figure 13:
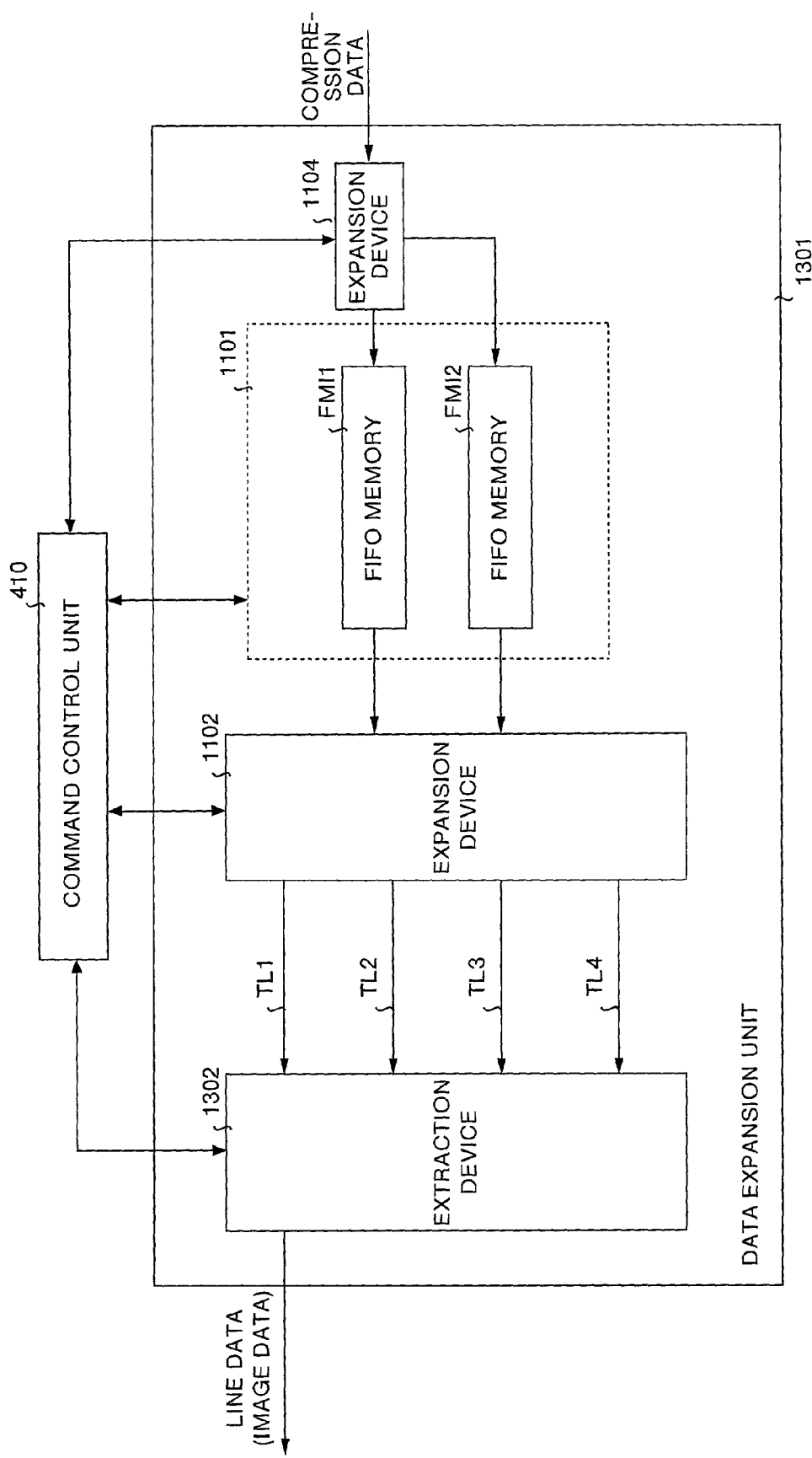
FIG. 13 shows a block diagram of the configuration of a data expansion unit of the image processor according to an second embodiment.

In the first place, the configuration and the operation of the data expansion unit according to the present embodiment will be described. FIG. 13 shows a block diagram of the configuration of the data expansion unit of the image processor according to the present embodiment, and FIG. 14 shows an explanatory view of the processing timing of the data expansion unit.

In FIG. 13, a data expansion unit 1301 comprises: the group of input side memories 1101 with the 1-port FIFO memories FMI1, and FMI2 storing image data which are compressed every four lines×four pixels per one line; the expansion device 1102 to expand the compressed image data; an extraction device 1302 to extract one line of image data to be extracted among four lines of expanded image data; and the switch 1104 to switch the output end of the compressed image data to either FMI1 or FMI2. Moreover, the command control unit 410 controls the group of input side memories 1101; the expansion device 1102; the extraction device 1302 and the switch 1104.

Figure 14:
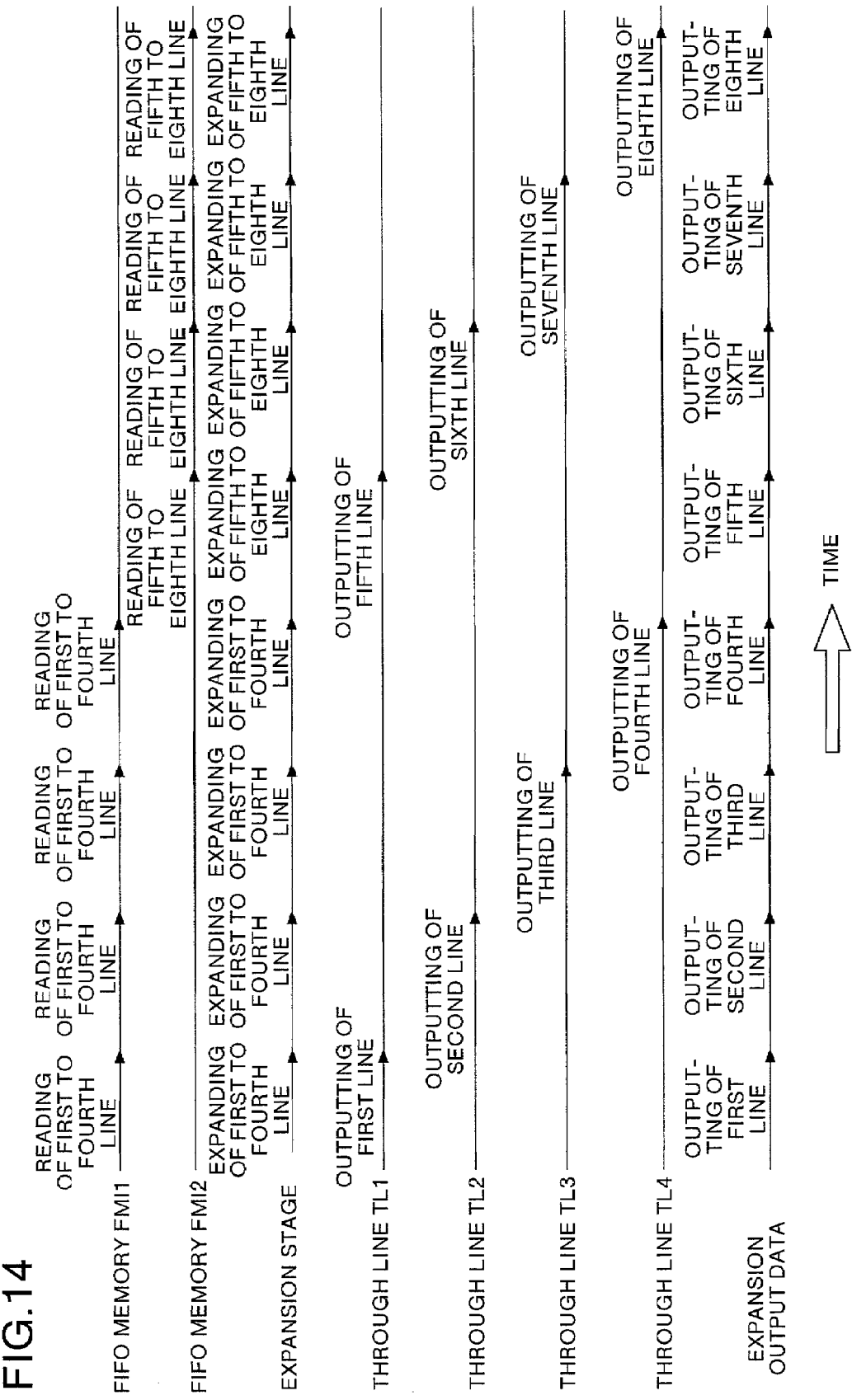
FIG. 14 shows an explanatory view of the processing timing of the data expansion unit of the image processor according to an second embodiment.
Figure 15:
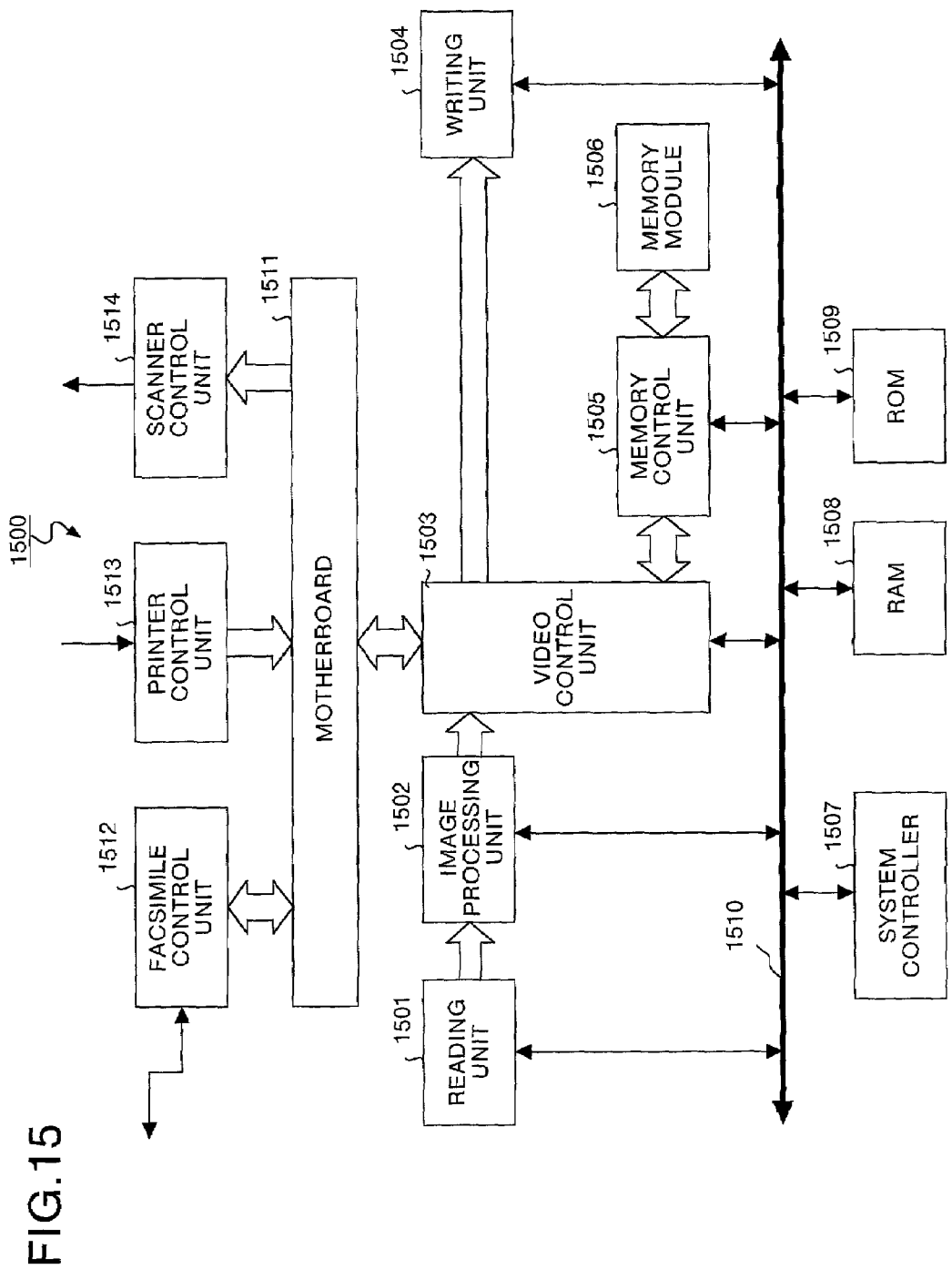
FIG. 15 shows a block diagram of an example of the configuration of a conventional digital integrated machine.

As shown in FIG. 14, image data are input through the parallel bus 220 (See FIG. 4) for expansion of the image data, in the first place. The input image data is stored into the FIFO memory FMI1 with the switch 1104, and the next image data to the FIFO memory FMI2 by switching. The expansion device 1102 expands the batch of compressed data, which are the first line to the fourth line of data, input from the FIFO memory FMI1.

Among the first to the fourth lines of image data which are expanded, the first line of the image data are extracted at the extraction device 1302. Though there are conceived to be various kinds of usage for extraction of image data at the extraction device 1302, a method to connect to the outside of the data expansion unit 1301 by a suitable switch 1104, for example, the switch 1104 may be listed. That is, one line of image data is output from the expansion device 1102 by control of the command control unit 410.

The command control unit 410 detects the extraction (output) of the first line of image data, and reads the first through the fourth lines of compressed image data stored in the FIFO memory MFI1 again. The expansion device 1102 performs batch expansion of the fourth line of the read image data. The extraction device 1302 extracts the second line of data, among the first to the fourth lines of image data, this time. Subsequently, in a similar way, the expansion device 1102 performs batch expansion of all the four lines of image data, and the extraction device 1302 extracts the third line of image data and the fourth line of data at the next cycle.

Then, the fifth to the eighth lines of compressed image data stored in the FIFO memory FMI2 are read, and batch expansion of the mare performed at the expansion device 1102, under control of the command control unit 410. The extraction device 1302 extracts the fifth line of data, among the fifth to eighth lines of expanded image data. Subsequently, in a similar way, the expansion device 1102 performs batch expansion of all the four lines of image data, and the extraction device 1302 sequentially extracts the sixth line, the seventh line, and the eighth line of image data.

In the data expansion unit 1302 of the image processor according to the second embodiment, the same image data (the four lines of compressed image data) are expanded four times between the switch 1104 and the expansion device 1102, and necessary lines of data are sequentially extracted at the extraction device 1302, and output to the outside of the data expansion unit 1301. It may be possible to reduce the number of the group of memories 1907, in comparison with those of the expansion unit 2101 (See FIG. 21) according to conventional techniques by this configuration. Therefore, the circuit size may be remarkably reduced.

As described above, according to one aspect of this invention, the dividing unit divides image data into m×n pixels, having n lines with m pixels per one line; the storage unit stores the image data of pixels, which are divided by the dividing unit; the compression unit performs batch compression of the image data of m×n pixels; the control unit controls to send the (n−1) lines of image data among m×n pixels of image data divided by the dividing unit to the storage unit, and the remaining one line of image data directly to the compression unit; at the same time, to send the m×(n−1) pixels of image data stored in the storage unit to the compression unit. Therefore, the capacity of one line of image data stored in storage unit may be reduced. Thereby, there may be obtained an advantage to provide an image processor with reduced circuit size.

Furthermore, the storage unit comprises (n−1) number of FIFO memories, and the control unit controls sending of each line of the image data divided by the dividing unit to the FIFO memories, respectively. Therefore, a simple control method may be realized. Thereby, there may be obtained an advantage to provide an image processor with reduced circuit size.

Moreover, according to another aspect of this invention, the expansion unit performs batch expansion of compressed data, that is, of compressed image data of m×n pixels; the storage unit stores expanded image data by the expansion unit; the control unit controls to send the one line of expanded image data with m pixels per one line by the expansion unit directly to the predetermined destination, and the image data with the remaining (n−1) lines of pixels to the storage unit, and further to send the image data with (n−1) lines of pixels, which are stored in the concerned storage unit, to the predetermined output destination. Therefore, the capacity of one line of image data stored in the storage unit may be reduced. Thereby, there may be obtained an advantage to provide an image processor with reduced circuit size.

Furthermore, the storage unit comprises (n−1) number of FIFO memories, and the control unit controls sending of each line of the image data expanded by the expansion unit to the FIFO memories, respectively. Therefore, a simple control method may be realized. Thereby, there may be obtained an advantage to provide an image processor with reduced circuit size.

Finally, according to still another aspect of this invention, the input unit inputs compressed data of image data compressed every image data of m×n pixels; the expansion unit performs batch expansion of compressed data input by the input unit to the image data of m×n pixels; the extraction unit extracts one line of image data, which comprise m pixels per one line, from image data of m×n pixels expanded by the expansion unit; the output unit outputs one line of image data extracted by the extraction unit; the detection unit detects whether one line of the image data has been output or not by the output unit; and the control unit controls the input unit to input the compressed data including the concerned image data again, when the output of the image data is detected by the detection unit; further controls the extraction unit to extract one line of image data which have not been previously extracted by the extraction unit; and the one line to the n lines of image data are sequentially output by repetition of the control. Therefore, storage unit to store image data expanded by expansion unit may be eliminated. Thereby, there may be obtained an advantage to provide an image processor with reduced circuit size.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processor comprising:
   a control unit configured to control the transfer of image data to predetermined destinations;
   a switch configured to divide the image data into m×n pixels based on a first command from the control unit, the image data having n lines with m pixels per line, the switch further configured to transfer each one of the n lines of the image data to one of the predetermined destinations based on a second command from the control unit;

a storage unit including (n−1) number of memories each configured to store one line of the n lines of the image data;

a compression unit configured to batch compress the image data of m×n pixels based on a third command from the control unit, wherein said control unit is further configured to:

control said switch to directly transfer (n−1) lines of the n lines of the image data to a first destination of the predetermined destinations, the first destination being the (n−1) number of memories, directly transfer a remaining one line of the n lines of the image data directly to a second destination of the predetermined destinations, the second destination being said compression unit; and control the storage unit to transfer the (n−1) lines of the image data stored in the (n−1) number of memories to said compression unit simultaneously with the direct transfer of said remaining one line of the n lines of the image data to said compression unit.

2. The image processor according to claim 1, wherein the (n−1) number of memories are (n−1) number of FIFO (first-in first-out) memories.

3. An image processor comprising:

means for controlling the transfer of image data to a predetermined destination;

means for dividing image data into m×n pixels based on a command from the means for controlling, the image data having n lines with m pixels per one line;

means for transferring each one of n lines of the image data to the predetermined destination based on a command from the means for controlling;

means for switching the predetermined destination for the each one of the n lines of the image data based on a command from the means for controlling;

means for storing (n−1) lines of the image data;

means for batch compressing the image data of m×n pixels based on a command from the means for controlling, wherein said means for controlling controls said means for switching to:

directly transfer (n−1) lines of the n lines of the image data to said means for storing, directly transfer the remaining one line of the n lines of the image data directly to said means for batch compressing; and control the means for storing to transfer the (n−1) lines of the image data stored in the means for storing to said means for batch compressing simultaneously with the direct transfer of said remaining one line of the n lines of the image data to said means for batch processing.

4. The image processor according to claim 3, wherein said means for storing comprises (n−1) number of FIFO (first-in first-out) memories.

5. An image processing method comprising:

controlling the transfer of image data to predetermined destinations;

dividing image data into m×n pixels based on a command from the controlling, the image data having n lines with m pixels per one line;

transferring each one of the n lines of the image data to one of the predetermined destinations based on a command from the controlling;

switching the predetermined destination for the each one of the n lines of the image data based on a command from the controlling;

storing one line of the n lines of the image data in each of (n−1) number of memories;

batch compressing the image data of m×n pixels based on a command from the controlling, wherein said transferring directly transfers (n−1) lines of the n lines of the image data to said (n−1) number of memories, said transferring directly transfers the remaining one line of the n lines of the image data directly to a compression unit based on said switching; and said transferring transfers the (n−1) lines stored in the (n−1) number of memories to said compression unit simultaneously with the direct transfer of said remaining one line of the n lines of the image data to said compression unit.

* * * * *